(12) United States Patent
Hosseini et al.

(10) Patent No.: US 10,623,167 B2
(45) Date of Patent: Apr. 14, 2020

(54) FEEDBACK PROCESSING TECHNIQUES IN WIRELESS TRANSMISSIONS

(71) Applicant: QUALCOMM Incorporated, San Diego, CA (US)

(72) Inventors: Seyedkianoush Hosseini, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 47 days.

(21) Appl. No.: 15/937,247

(22) Filed: Mar. 27, 2018

(65) Prior Publication Data

US 2018/0287764 A1 Oct. 4, 2018

Related U.S. Application Data

(60) Provisional application No. 62/478,571, filed on Mar. 29, 2017, provisional application No. 62/479,297, filed on Mar. 30, 2017.

(51) Int. Cl.
*H04L 5/00* (2006.01)
*H04W 72/04* (2009.01)
*H04L 1/18* (2006.01)

(52) U.S. Cl.
CPC .......... *H04L 5/0055* (2013.01); *H04L 1/1812* (2013.01); *H04L 1/1822* (2013.01);
(Continued)

(58) Field of Classification Search
CPC ............ H04W 72/0413; H04W 72/044; H04L 1/1812; H04L 1/1854; H04L 1/1864; H04L 5/0055; H04L 1/1822; H04L 5/0007
See application file for complete search history.

(56) References Cited

U.S. PATENT DOCUMENTS

2013/0250925 A1* 9/2013 Lohr ................ H04W 72/0446
370/336
2014/0369325 A1* 12/2014 Bergstrom ........ H04W 56/0045
370/336
(Continued)

OTHER PUBLICATIONS

CATT: "Considerations on Timing Relationships and Number of HARQ," 3GPP Draft; R1-1704584, 3rd Generation Partnership Project (3GPP), Mobile Competence Centre; 650, Route Des Lucioles; F-06921 Sophia-Antipolis Cedex; France, vol. RAN WG1, No. Spokane, USA; Apr. 3, 2017-Apr. 7, 2017, Mar. 25, 2017, XP051251354, 3 pages, Retrieved from the Internet: URL: http://www.3gpp.org/ftp/tsg_ran/WG1_RL1/TSGR1_88b/Docs/ [retrieved on Mar. 25, 2017].

(Continued)

*Primary Examiner* — Mandish K Randhawa
(74) *Attorney, Agent, or Firm* — Anthony R. Morris

(57) ABSTRACT

Methods, systems, and devices for wireless communication are described in which a base station may identify a processing timeline for a user equipment to transmit a HARQ feedback transmission in response to a downlink transmission and determine a configuration for a number of HARQ processes for use by the UE. The number of HARQ processes may be based on the processing timeline, a timing advance (TA) of the UE, and a duration of transmission time intervals (TTIs) for communications between the UE and the base station. The base station may transmit the configuration to the UE, and the UE may operate according to the number of configured HARQ processes.

28 Claims, 23 Drawing Sheets

(52) U.S. Cl.
CPC .......... *H04L 1/1854* (2013.01); *H04L 1/1864* (2013.01); *H04W 72/044* (2013.01); *H04W 72/0413* (2013.01); *H04L 5/0007* (2013.01)

(56) References Cited

U.S. PATENT DOCUMENTS

| | | | | |
|---|---|---|---|---|
| 2015/0063180 | A1* | 3/2015 | Chen | H04L 1/1822 370/280 |
| 2018/0176000 | A1* | 6/2018 | Lee | H04L 1/1822 |
| 2019/0045505 | A1* | 2/2019 | Yang | H04W 72/1284 |

OTHER PUBLICATIONS

Ericsson: "On the Number of HARQ Processes," 3GPP Draft; R1-1700696, 3rd Generation Partnership Project (3GPP), Mobile Competence Centre; 650, Route Des Lucioles; F-06921 Sophia-Antipolis Cedex; France, vol. RAN WG1, No. Spokane, Wa; Jan. 16, 2017-Jan. 20, 2017, Jan. 9, 2017, XP051202578, 2 pages, Retrieved from the Internet: URL: http://www.3gpp.org/ftp/tsg_ran/WG1_RL1/TSGR1_AH/NR_AH_1701/Docs/ [retrieved on Jan. 9, 2017].

Fraunhofer HHI: "HARQ Timing and Number of HARQ Processes for NR," 3GPP Draft; R1-1703330_HARQ_Timing_And_Number_Of_Process, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 13, 2017-Feb. 17, 2017, Feb. 12, 2017, XP051210460, 3 pages, Retrieved from the Internet: URL: http://www.3gpp.org/ftp/Meetings_3GPP_SYNC/RAN1/Docs/ [retrieved on Feb. 12, 2017].

International Search Report and Written Opinion—PCT/US2018/024884—ISA/EPO—Jul. 9, 2018.

Samsung: "Processing Time and Number of HARQ Processes," 3GPP Draft; R1-1702991—Processing Time and Number of HARQ Processes, 3rd Generation Partnership Project (3GPP), Mobile Competence Centre; 650, Route Des Lucioles; F-06921 Sophia-Antipolis Cedex; vol. RAN WG1, No. Athens, Greece; Feb. 13, 2017-Feb. 17, 2017, Feb. 12, 2017, XP051210133, 4 pages, Retrieved from the Internet: URL: http://www.3gpp.org/ftp/Meetings_3GPP_SYNC/RAN1/Docs/ [retrieved on Feb. 12, 2017].

* cited by examiner

FEEDBACK PROCESSING TECHNIQUES IN WIRELESS TRANSMISSIONS

CROSS REFERENCES

The present application for patent claims priority to U.S. Provisional Patent Application No. 62/478,571 by Hosseini, et al., entitled "Feedback Processing Techniques In Wireless Transmissions," filed Mar. 29, 2017, and to U.S. Provisional Patent Application No. 62/479,297 by Hosseini, et al., entitled "Feedback Processing Techniques In Wireless Transmissions," filed Mar. 30, 2017 and assigned to the assignee hereof.

BACKGROUND

The following relates generally to wireless communication, and more specifically to feedback processing techniques in wireless transmissions.

Wireless multiple-access technologies have been adopted in various telecommunication standards to provide a common protocol that enables different wireless devices to communicate on a municipal, national, regional, and even global level. An example telecommunication standard is Long Term Evolution (LTE). LTE is designed to improve spectral efficiency, lower costs, improve services, make use of new spectrum, and better integrate with other open standards. LTE may use OFDMA on the downlink (DL), single-carrier frequency division multiple access (SC-FDMA) on the uplink (UL), and multiple-input multiple-output (MIMO) antenna technology.

In some examples, a wireless multiple-access communication system may include a number of base stations, each simultaneously supporting communication for multiple communication devices, otherwise known as user equipment (UEs). In a LTE or LTE-Advanced (LTE-A) networks, a set of one or more base stations may define an eNodeB (eNB). In other examples (e.g., in a next generation new radio (NR) or 5G network), a wireless multiple access communication system may include a number of smart radio heads (RHs) in communication with a number of access node controllers (ANCs), where a set of one or more RHs, in communication with an ANC, defines a base station (e.g., an eNB or gNB). In other examples, such as a cloud radio access network (C-RAN) or centralized RAN, a remote radio unit (RRU) or central unit may be connected to multiple baseband units (BBUs) through a fiber connection, and the BBUs may transmit wireless transmissions to one or more UEs. A base station may communicate with a set of UEs on downlink (DL) channels (e.g., for transmissions from a base station to a UE) and uplink (UL) channels (e.g., for transmissions from a UE to a base station).

Different UEs within a multiple-access communications system may have varying standards from one another based on particular applications or deployments. Systems may therefore need to support multiple wireless communication services. In some cases, wireless communications services may have relatively low latency requirements and may use shorter transmission time intervals (TTIs) compared with services that have higher latency requirements. In some cases, reliability for wireless communications may be enhanced through feedback mechanisms that may provide for retransmission of unsuccessfully received transmissions, such as according to hybrid acknowledgment repeat request (HARQ) feedback techniques.

SUMMARY

Some wireless communication systems may be operable to support a several wireless communications service types using various enhancements to resource configurations, feedback mechanisms, and the like. A system may, for example, support a service type associated with communications having high reliability and low-latency. In such systems, these high reliability, low latency communications (HRLLCs) may be configured to coexist with other service types with different (e.g., more relaxed) latency and reliability constraints. Considerations for such systems may include configuration of HRLLC and hybrid acknowledgment repeat request (HARQ) process adjustments based on transmission time interval (TTI) durations, timing advance (TA) values, and UE processing capabilities. In some cases, a central node, or remote radio unit (RRU) may provide data to be transmitted to a baseband unit (BBU) for radio transmission to UEs. Propagation delays associated with the connection (e.g., a fiber connection) between a RRU and BBU may be accounted for at either the RRU or BBU in order to provide wireless transmissions from the BBU that are aligned with TTIs for the transmissions. Various methods, systems, and apparatuses, are described herein that support high reliability, low latency configurations.

A method of wireless communication is described. The method may include identifying a processing timeline for a UE to transmit a HARQ feedback transmission in response to a downlink transmission, the processing timeline comprising a duration of time between the downlink transmission and an uplink transmission that includes the HARQ feedback, determining a configuration establishing a number of HARQ processes for use by the UE, the number of HARQ processes based at least in part on the processing timeline, a TA of the UE, and a duration of TTIs associated with the HARQ feedback transmission, and transmitting the configuration to the UE. In some cases, the processing timeline may be a timeline for the UE to transmit an uplink shared channel transmission after receiving an uplink grant from a base station.

An apparatus for wireless communication is described. The apparatus may include means for identifying a processing timeline for a UE to transmit a HARQ feedback transmission in response to a downlink transmission, the processing timeline comprising a duration of time between the downlink transmission and an uplink transmission that includes the HARQ feedback, means for determining a configuration establishing a number of HARQ processes for use by the UE, the number of HARQ processes based at least in part on the processing timeline, a TA of the UE, and a duration of TTIs associated with the HARQ feedback transmission, and means for transmitting the configuration to the UE.

Another apparatus for wireless communication is described. The apparatus may include a processor, memory in electronic communication with the processor, and instructions stored in the memory. The instructions may be operable to cause the processor to identify a processing timeline for a UE to transmit a HARQ feedback transmission in response to a downlink transmission, the processing timeline comprising a duration of time between the downlink transmission and an uplink transmission that includes the HARQ feedback, determine a configuration establishing a number of HARQ processes for use by the UE, the number of HARQ processes based at least in part on the processing timeline, a TA of the UE, and a duration of TTIs associated with the HARQ feedback transmission, and transmit the configuration to the UE.

A non-transitory computer readable medium for wireless communication is described. The non-transitory computer-readable medium may include instructions operable to cause a processor to identify a processing timeline for a UE to transmit a HARQ feedback transmission in response to a downlink transmission, the processing timeline comprising a duration of time between the downlink transmission and an uplink transmission that includes the HARQ feedback, determine a configuration establishing a number of HARQ processes for use by the UE, the number of HARQ processes based at least in part on the processing timeline, a TA of the UE, and a duration of TTIs associated with the HARQ feedback transmission, and transmit the configuration to the UE.

In some examples of the method, apparatus, and non-transitory computer-readable medium described above, the determining the configuration may include identifying a processing capability of the UE, and determining the number of HARQ processes based at least in part on the processing capability of the UE and the TA of the UE.

Some examples of the method, apparatus, and non-transitory computer-readable medium described above may further include processes, features, means, or instructions for configuring UEs having a greater processing capability with fewer HARQ processes than UEs having lower processing capability.

In some examples of the method, apparatus, and non-transitory computer-readable medium described above, the determining the configuration may include identifying a threshold TA value for setting the number of HARQ processes at the UE, comparing the TA of the UE to the threshold propagation delay value, and setting a first number of HARQ processes or a second number of HARQ processes for use by the UE based at least in part on whether the TA of the UE may be less than or greater than the threshold propagation delay value, wherein the first number of HARQ processes may be less than the second number of HARQ processes.

In some examples of the method, apparatus, and non-transitory computer-readable medium described above, the determining the configuration may include identifying the TA of the UE based on a first TA value for transmissions between the UE and a baseband unit and a second TA value for transmissions between the baseband unit and a central network node, and wherein the number of HARQ processes may be based at least in part on the second TA value, the first TA value, or any combination thereof.

In some examples of the method, apparatus, and non-transitory computer-readable medium described above, the determining the configuration may include comparing the second TA value to a threshold TA value, and wherein the number of HARQ processes may be further determined based at least in part on the comparing. The threshold TA value may correspond to a TA at which the UE may perform HARQ processing without additional HARQ processes being configured.

In some examples of the method, apparatus, and non-transitory computer-readable medium described above, the identifying the processing timeline may include determining a maximum TA value for the UE, and determining the processing timeline based at least in part on the maximum TA value. In some examples of the method, apparatus, and non-transitory computer-readable medium described above, the processing timeline may be further based at least in part on a processing capability of the UE. In some examples of the method, apparatus, and non-transitory computer-readable medium described above, the HARQ feedback transmission may be associated with a four-bit HARQ ID.

Some examples of the method, apparatus, and non-transitory computer-readable medium described above may further include processes, features, means, or instructions for configuring a RTT for the HARQ feedback transmission and an associated retransmission of the downlink transmission, the RTT based on the processing timeline irrespective of the number of HARQ processes. In some examples of the method, apparatus, and non-transitory computer-readable medium described above, the transmitting the configuration to the UE comprises transmitting RRC signaling to the UE or DCI to the UE that includes configuration information.

A method of wireless communication is described. The method may include identifying, at a UE, a TA for transmissions between the UE and a base station, transmitting an indication of the TA to the base station, and receiving configuration information from the base station that indicates a number of HARQ processes that are to be configured at the UE based at least in part on the TA and a duration of TTIs associated with the HARQ processes.

An apparatus for wireless communication is described. The apparatus may include means for identifying, at a UE, a TA for transmissions between the UE and a base station, means for transmitting an indication of the TA to the base station, and means for receiving configuration information from the base station that indicates a number of HARQ processes that are to be configured at the UE based at least in part on the TA and a duration of TTIs associated with the HARQ processes.

Another apparatus for wireless communication is described. The apparatus may include a processor, memory in electronic communication with the processor, and instructions stored in the memory. The instructions may be operable to cause the processor to identify, at a UE, a TA for transmissions between the UE and a base station, transmit an indication of the TA to the base station, and receive configuration information from the base station that indicates a number of HARQ processes that are to be configured at the UE based at least in part on the TA and a duration of TTIs associated with the HARQ processes.

A non-transitory computer readable medium for wireless communication is described. The non-transitory computer-readable medium may include instructions operable to cause a processor to identify, at a UE, a TA for transmissions between the UE and a base station, transmit an indication of the TA to the base station, and receive configuration information from the base station that indicates a number of HARQ processes that are to be configured at the UE based at least in part on the TA and a duration of TTIs associated with the HARQ processes.

Some examples of the method, apparatus, and non-transitory computer-readable medium described above may further include processes, features, means, or instructions for receiving a processing timeline in the configuration information, the processing timeline comprising a duration of time between a downlink transmission from the base station and an uplink transmission to the base station that includes HARQ feedback, the processing timeline based at least in part on the duration of the TTIs. In some examples of the method, apparatus, and non-transitory computer-readable medium described above, the processing timeline may be based at least in part on a maximum TA value for the UE. In some examples of the method, apparatus, and non-transitory computer-readable medium described above, the processing timeline may be further based at least in part on a processing capability of the UE.

Some examples of the method, apparatus, and non-transitory computer-readable medium described above may further include processes, features, means, or instructions for receiving the downlink transmission from the base station.

Some examples of the method, apparatus, and non-transitory computer-readable medium described above may further include processes, features, means, or instructions for processing the downlink transmission according to a first HARQ process to generate ACK/NACK feedback, the first HARQ process associated with a four-bit HARQ ID. Some examples of the method, apparatus, and non-transitory computer-readable medium described above may further include processes, features, means, or instructions for transmitting the ACK/NACK feedback according to the processing timeline.

Some examples of the method, apparatus, and non-transitory computer-readable medium described above may further include processes, features, means, or instructions for transmitting an indication of a processing capability of the UE to the base station, and wherein the number of HARQ processes may be further based at least in part on the processing capability.

In some examples of the method, apparatus, and non-transitory computer-readable medium described above, the configuration information comprises a threshold TA value for setting the number of HARQ processes at the UE, and a UE may compare the TA to the threshold propagation delay value, and set a first number of HARQ processes or a second number of HARQ processes based at least in part on whether the TA may be less than or greater than the threshold propagation delay value, wherein the first number of HARQ processes may be less than the second number of HARQ processes.

Some examples of the method, apparatus, and non-transitory computer-readable medium described above may further include processes, features, means, or instructions for configuring a plurality of soft buffers for buffering received transmissions associated with one or more of the HARQ processes, a number of the soft buffers based at least in part on a number of TTIs in a processing timeline or the number of HARQ processes.

In some examples of the method, apparatus, and non-transitory computer-readable medium described above, the receiving the configuration information comprises receiving RRC signaling or DCI that includes the configuration information.

A method of wireless communication is described. The method may include identifying, at a central network node, a time delay associated with a first transmission from the central network node to a BBU, wherein the first transmission is to be transmitted from the BBU to a UE over a wireless communications link, adjusting a transmission time of the first transmission based at least in part on the time delay to provide that the first transmission arrives at the BBU for transmission to the UE at a start of a first TTI associated with the first transmission, and transmitting the first transmission to the BBU according to the adjusted transmission time.

An apparatus for wireless communication is described. The apparatus may include means for identifying, at a central network node, a time delay associated with a first transmission from the central network node to a BBU, wherein the first transmission is to be transmitted from the BBU to a UE over a wireless communications link, means for adjusting a transmission time of the first transmission based at least in part on the time delay to provide that the first transmission arrives at the BBU for transmission to the UE at a start of a first TTI associated with the first transmission, and means for transmitting the first transmission to the BBU according to the adjusted transmission time.

Another apparatus for wireless communication is described. The apparatus may include a processor, memory in electronic communication with the processor, and instructions stored in the memory. The instructions may be operable to cause the processor to identify, at a central network node, a time delay associated with a first transmission from the central network node to a BBU, wherein the first transmission is to be transmitted from the BBU to a UE over a wireless communications link, adjust a transmission time of the first transmission based at least in part on the time delay to provide that the first transmission arrives at the BBU for transmission to the UE at a start of a first TTI associated with the first transmission, and transmit the first transmission to the BBU according to the adjusted transmission time.

A non-transitory computer readable medium for wireless communication is described. The non-transitory computer-readable medium may include instructions operable to cause a processor to identify, at a central network node, a time delay associated with a first transmission from the central network node to a BBU, wherein the first transmission is to be transmitted from the BBU to a UE over a wireless communications link, adjust a transmission time of the first transmission based at least in part on the time delay to provide that the first transmission arrives at the BBU for transmission to the UE at a start of a first TTI associated with the first transmission, and transmit the first transmission to the BBU according to the adjusted transmission time.

In some examples of the method, apparatus, and non-transitory computer-readable medium described above, the time delay may be associated with a propagation delay of a fiber connection between the central network node and the BBU. In some examples of the method, apparatus, and non-transitory computer-readable medium described above, the first TTI of the first transmission may be shorter than a second TTI of a second transmission from the central network node to the BBU.

A method of wireless communication is described. The method may include receiving, at a BBU, a first transmission from a central network node, wherein the first transmission is to be transmitted from the BBU to a UE over a wireless communications link, identifying a time delay associated with the first transmission from the central network node, adjusting a transmission time for transmitting the first transmission to the UE based at least in part on the time delay to align a start of the first transmission with a starting boundary of a first TTI associated with the first transmission, and transmitting the first transmission to the UE according to the adjusted transmission time.

An apparatus for wireless communication is described. The apparatus may include means for receiving, at a BBU, a first transmission from a central network node, wherein the first transmission is to be transmitted from the BBU to a UE over a wireless communications link, means for identifying a time delay associated with the first transmission from the central network node, means for adjusting a transmission time for transmitting the first transmission to the UE based at least in part on the time delay to align a start of the first transmission with a starting boundary of a first TTI associated with the first transmission, and means for transmitting the first transmission to the UE according to the adjusted transmission time.

Another apparatus for wireless communication is described. The apparatus may include a processor, memory in electronic communication with the processor, and instructions stored in the memory. The instructions may be operable to cause the processor to receive, at a BBU, a first transmission from a central network node, wherein the first transmission is to be transmitted from the BBU to a UE over a wireless communications link, identify a time delay associated with the first transmission from the central network node, adjust a transmission time for transmitting the first transmission to the UE based at least in part on the time delay to align a start of the first transmission with a starting boundary of a first TTI associated with the first transmission, and transmit the first transmission to the UE according to the adjusted transmission time.

A non-transitory computer readable medium for wireless communication is described. The non-transitory computer-readable medium may include instructions operable to cause a processor to receive, at a BBU, a first transmission from a central network node, wherein the first transmission is to be transmitted from the BBU to a UE over a wireless communications link, identify a time delay associated with the first transmission from the central network node, adjust a transmission time for transmitting the first transmission to the UE based at least in part on the time delay to align a start of the first transmission with a starting boundary of a first TTI associated with the first transmission, and transmit the first transmission to the UE according to the adjusted transmission time.

In some examples of the method, apparatus, and non-transitory computer-readable medium described above, the time delay may be associated with a propagation delay of a fiber connection between the central network node and the BBU. In some examples of the method, apparatus, and non-transitory computer-readable medium described above, the first TTI of the first transmission may be shorter than a second TTI of a second transmission from the central network node to the BBU.

DETAILED DESCRIPTION

Wireless communications systems as described herein may be configured to support a plurality of service types with different latency, reliability, or throughput rates or standards. One such service type may be referred to herein as high-reliability, low latency communication (HRLLC). Various techniques described may be employed to improve HRLLC performance while supporting coexistence with legacy service types or other service types that may be supported by the wireless communications system. The described techniques may be employed for HRLLC enhancements and hybrid acknowledgment repeat request (HARQ) process adjustments based on transmission time interval (TTI) durations, timing advance (TA) values, and user equipment (UE) processing capabilities.

By way of example, a base station in some LTE or NR deployments may identify a processing timeline for a UE to transmit a HARQ feedback transmission in response to a downlink transmission, such as an N+4 or N+6 timeline, and determine a configuration for a number of HARQ processes for use by the UE. In some cases, the processing timeline may be a timeline for the UE to transmit an uplink shared channel transmission (e.g., a PUSCH transmission) after receiving an uplink grant from a base station. The number of HARQ processes may be based on the processing timeline, a timing advance (TA) of the UE, and a duration of transmission time intervals (TTIs) for communications between the UE and the base station. The base station may transmit the configuration to the UE, and the UE may operate according to the number of configured HARQ processes. In some cases, a first number of HARQ processes may be used if a TA of the UE is below a threshold value, and a second larger number of HARQ processes may be used in the TA of the UE is above the threshold. Additionally or alternatively, the number of HARQ processes may be based on a processing capability of the UE.

In some cases, such as in C-RAN configurations, a central node, or remote radio unit (RRU) may provide data to be transmitted to a baseband unit (BBU) for radio transmission to UEs. Propagation delays associated with the connection (e.g., a fiber connection) between a RRU and BBU may be accounted for at either the RRU or BBU in order to provide wireless transmissions from the BBU that are aligned with TTIs for the transmissions.

Aspects of the disclosure are initially described in the context of a wireless communications system. Aspects of the disclosure are further illustrated by and described with reference to apparatus diagrams, system diagrams, and flowcharts that relate to feedback processing techniques in wireless transmissions.

Figure 1:
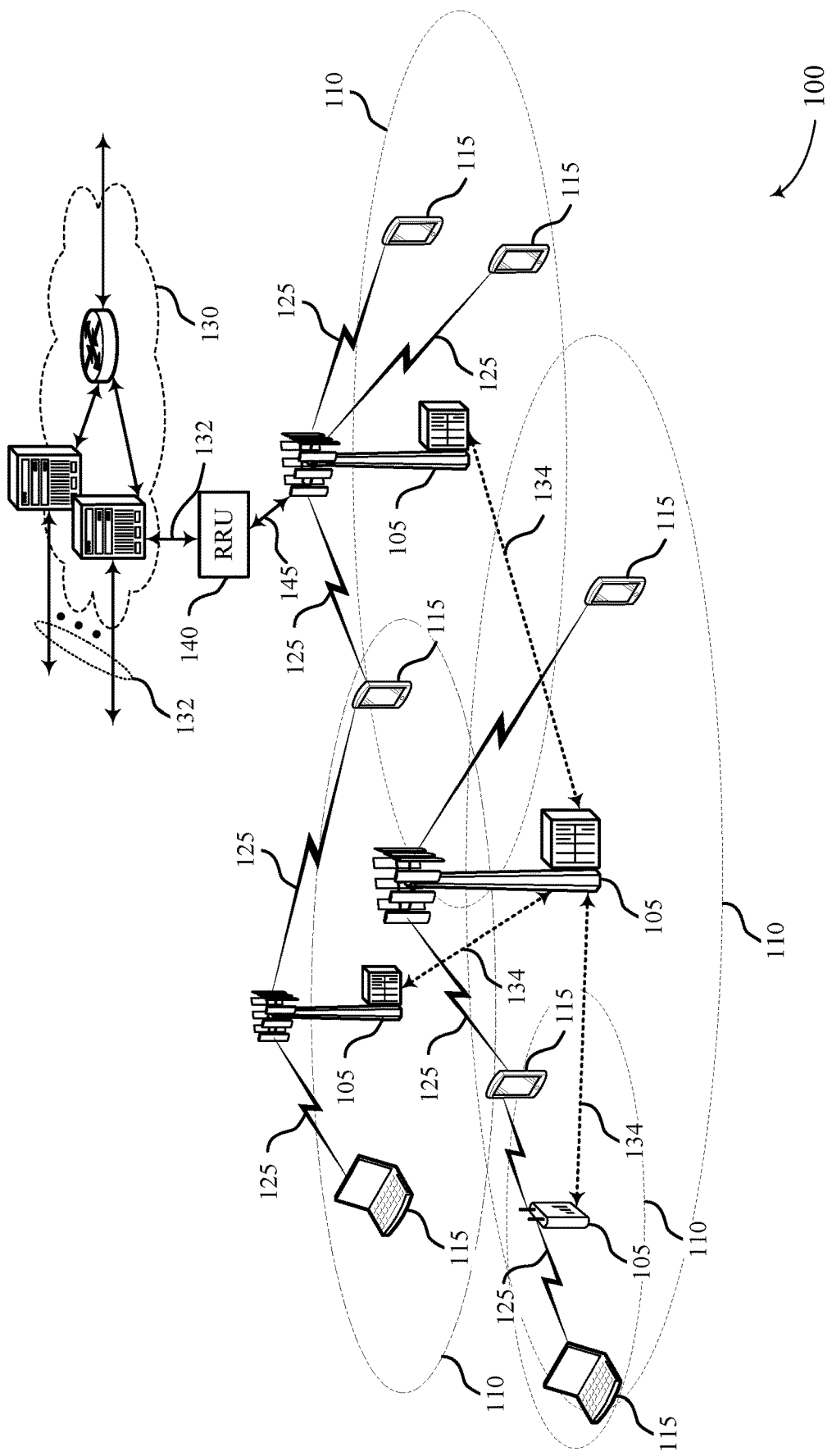
FIG. 1 illustrates an example of a system for wireless communication that supports feedback processing techniques in wireless transmissions in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices. System 100 may be configured to provide multiple wireless communication services, including, for example high reliability low latency communications and may configure HARQ processes according to TTIs of communications, TAs of devices, processing timelines, UE capability, or any combination thereof.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105. In some cases, such as in C-RAN deployments, base stations 105 may include one or more BBUs, which may be connected by a fiber connection 145 to a RRU 140. RRU 140, also referred to as a central unit or central network device, may be connected with core network 130 via backhaul link 132.

The core network 130 may provide user authentication, access authorization, tracking, Internet Protocol (IP) connectivity, and other access, routing, or mobility functions. In some deployments, at least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the Radio Resource Control (RRC) protocol layer may provide establishment, configuration, and maintenance of an RRC connection between a UE 115 and a network device 105-*c*, network device 105-*b*, or core network 130 supporting radio bearers for user plane data. At the Physical (PHY) layer, transport channels may be mapped to physical channels.

HARQ enables the overhead of error correction to be adapted dynamically depending on the channel quality. When HARQ is used, if errors are able to be corrected using forward error correction (FEC) techniques, then no retransmission is requested. If errors are detected but not corrected, a retransmission is requested. Thus, HARQ is be a method of ensuring that data is received correctly over a wireless communication link 125. HARQ may include a combination of error detection (e.g., using a cyclic redundancy check (CRC)), FEC, and retransmission (e.g., automatic repeat request (ARQ)) and may improve throughput at the MAC layer in poor radio conditions. In Incremental Redundancy HARQ, incorrectly received data may be stored in a soft buffer and combined with subsequent transmissions to improve the overall likelihood of successfully decoding the data. In some cases, redundancy bits are added to each message prior to transmission. This may be useful in poor conditions. In other cases, redundancy bits are not added to each transmission, but are retransmitted after the transmitter of the original message receives a negative acknowledgement (NACK) indicating a failed attempt to decode the information. The chain of transmission, response and retransmission may be referred to as a HARQ process. In some cases, a limited number of HARQ processes may be used for a given communication link 125, with the number of HARQ processes being dynamically configurable by a base station 105 based on conditions at a UE 115.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power). In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols.

In some cases, the TTI duration (that is, the number of symbols in a TTI) may be variable.

In some cases, a base station 105 may identify a processing timeline for a UE 115 to transmit a HARQ feedback transmission in response to a downlink transmission, such as an N+4 or N+6 timeline, and determine a configuration for a number of HARQ processes for use by the UE. The number of HARQ processes may be based on the processing timeline, a TA of the UE, a duration of TTIs for communications between the UE 115 and the base station 105, a UE 115 processing capability, or any combination thereof. The base station 105 may transmit the configuration to the UE 115, and the UE 115 may operate according to the number of configured HARQ processes. In some cases, a first number of HARQ processes may be used if a TA of the UE 115 is below a threshold value, and a second larger number of HARQ processes may be used in the TA of the UE 115 is above the threshold. Additionally or alternatively, the number of HARQ processes may be based on a processing capability of the UE 115.

In some cases, such as in C-RAN configurations, a central node, or remote radio unit (RRU) 140 may provide data to be transmitted to a baseband unit (BBU) for radio transmission to UEs 115. Propagation delays associated with the connection (e.g., a fiber connection) between a RRU and BBU may be accounted for at either the RRU or BBU in order to provide wireless transmissions from the BBU that are aligned with TTIs for the transmissions.

Figure 2:
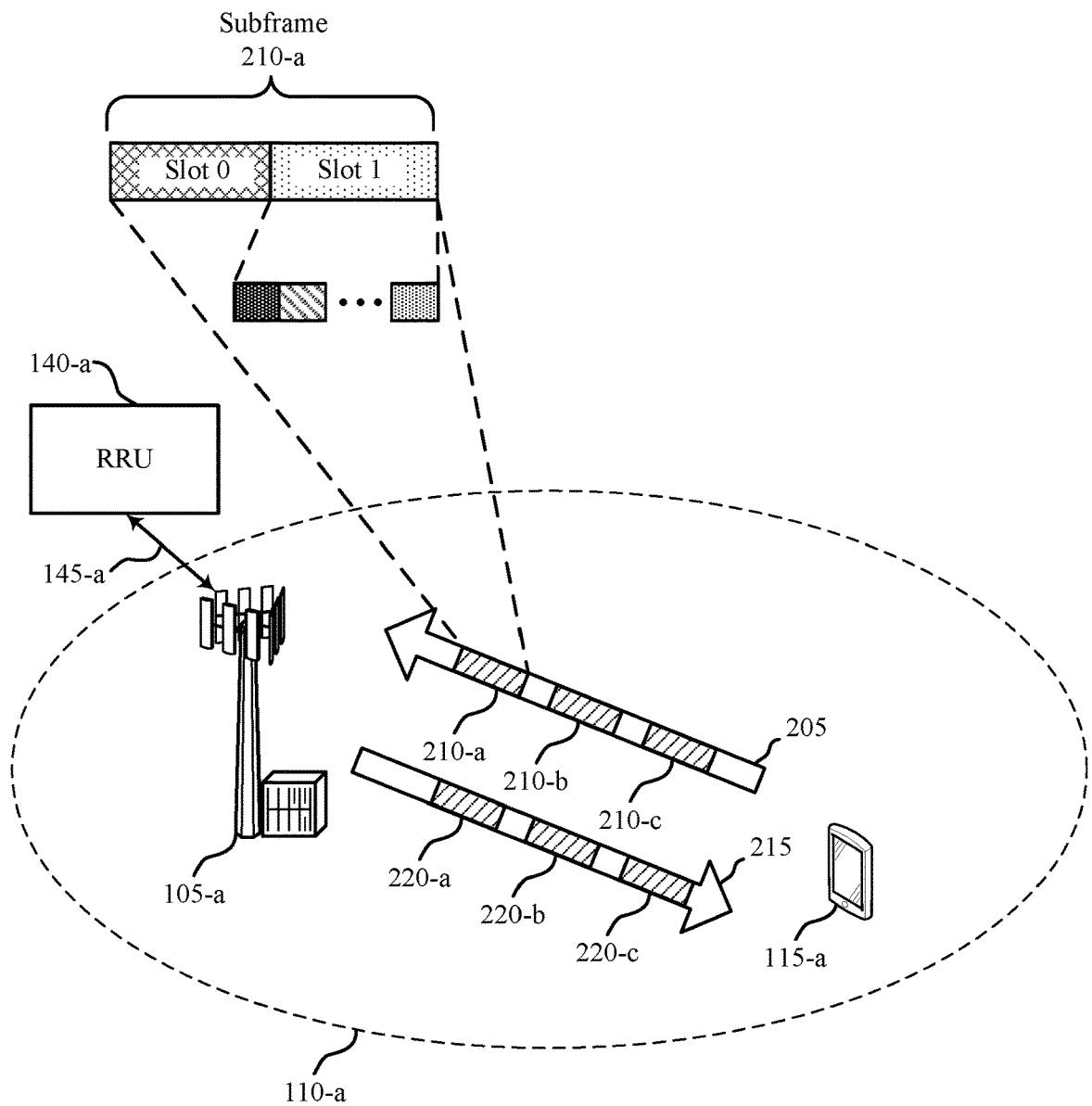
FIG. 2 illustrates an example of a wireless communication system that supports feedback processing techniques in wireless transmissions in accordance with aspects of the present disclosure.

FIG. 2 illustrates an example of a wireless communication system 200 that supports feedback processing techniques in wireless transmissions in accordance with various aspects of the present disclosure. Wireless communications system 200 includes base station 105-*a* and UE 115-*a*, which may be examples of aspects of the corresponding devices as described above with reference to FIG. 1. In the example of FIG. 2, the wireless communications system 200 may operate according to a radio access technology (RAT) such as a LTE, 5G, or NR RAT, although techniques described herein may be applied to any RAT and to systems that may concurrently use two or more different RATs. In some cases, the wireless communication system 200 may be part of a C-RAN deployment, and a RRU 140-*a* may provide transmissions to a BBU at the base station 105-*a* for transmission to the UE 115-*a*.

Base station 105-*a* may communicate with UE 115-*a* over an uplink carrier 205 and a downlink carrier 215. In some examples, base station 105-*a* may allocate resources for communication with UEs over uplink carrier 205 and downlink carrier 215. In C-RAN deployments, the RRU 140-*a* may allocate resources, and the BBU may transmit wireless transmissions according to the received transmissions from the RRU 140-*a*. For example, base station 105-*a* or RRU 140-*a* may allocate uplink subframes 210 in uplink carrier 205 for uplink transmissions from UE 115-*a*, and one or more uplink subframes 210 may correspond to a legacy LTE TTI of 1 ms. In this example, uplink subframes 210 may include a first uplink subframe 210-*a*, a second uplink subframe 210-*b*, and a third uplink subframe 210-*c*. Each of the uplink subframes 210 may include two slots, in which each slot may have seven OFDM symbols for a normal cyclic prefix. In this example, a first slot (slot 0) 225 and a second slot (slot 1) 230 may be included in the first subframe 210-*a*. Shortened TTIs may be included or coincide with a slot; sTTIs may include several sTTIs, like sTTI-0 235, sTTI-1, 240 . . . , sTTI-n 245.

As indicated above, in a low latency wireless communication system 200, different TTI lengths may be used for transmissions over uplink carrier 205 and/or downlink carrier 215. For example, two-symbol sTTI and 1-slot sTTI durations may be supported for physical uplink control channel (PUCCH) and physical uplink shared channel (PUSCH) transmissions (or shortened PUCCH (sPUCCH) and shortened PUSCH (sPUSCH) transmissions). In some examples, UE 115-a may be semi-statically configured (e.g., and/or dynamically triggered) with HRLLC while still maintaining legacy 1-ms TTI based communications. By way of example, the possible combinations of 1-ms based TTI for a UE 115 may include 1-ms TTI with N+4 timing or N+3 timing. In some examples, slot TTI or 2-symbol TTI lengths may be used with N+4 or N+6 timing. Such timing may be referred to as a processing timeline and may relate to the number of TTIs or sTTIs between a downlink transmission (e.g., PDCCH, PUSCH, etc.) and a responsive uplink transmission (e.g., PUCCH, PUSCH, etc., containing a HARQ feedback transmission). Or the timing may relate to an uplink transmission and a responsive downlink transmission (e.g., PDSCH, retransmission, etc.).

In existing LTE deployments, a processing timeline of n+4 with the maximum TA value of 667 µs may be assumed. In cases where N+4 timing is used, when receiving a transmission in a downlink TTI the UE 115-a, in a worst-case scenario, may have 3 ms minus the maximum TA for processing of the downlink transmission and preparing the responsive HARQ feedback transmission (i.e., 3 ms-667 µs). In low latency communications, this processing time may be reduced based on the shorter processing timelines that may be present in low latency communications. In some cases, a maximum TA value may also be reduced, in order to provide the UE 115-a with sufficient processing time to receive a transmission, perform HARQ processing, and prepare the HARQ feedback transmission. Reducing the value of the maximum TA results in a corresponding reduction in the coverage area 110-a, as the UE 115-a may need to be closer to the base station 105-a. In some cases, such as a 2-symbol TTI that has an N+4 processing timeline, depending upon UE 115-a capabilities, the maximum TA may be substantially reduced, which may limit the deployment scenarios where these features can be implemented. Furthermore, in some deployments, such as C-RAN deployments, the propagation time between a RRU and BBU may be relatively large and processing timeline relative to when a RRU transmits a TTI may have a relatively large portion consumed be the TA associated with the RRC to BBU transmission. Various aspects of the present disclosure provide techniques that may allow a larger maximum TA to be used through configuring additional HARQ processes, as will be discussed in more detail below.

Figure 3:
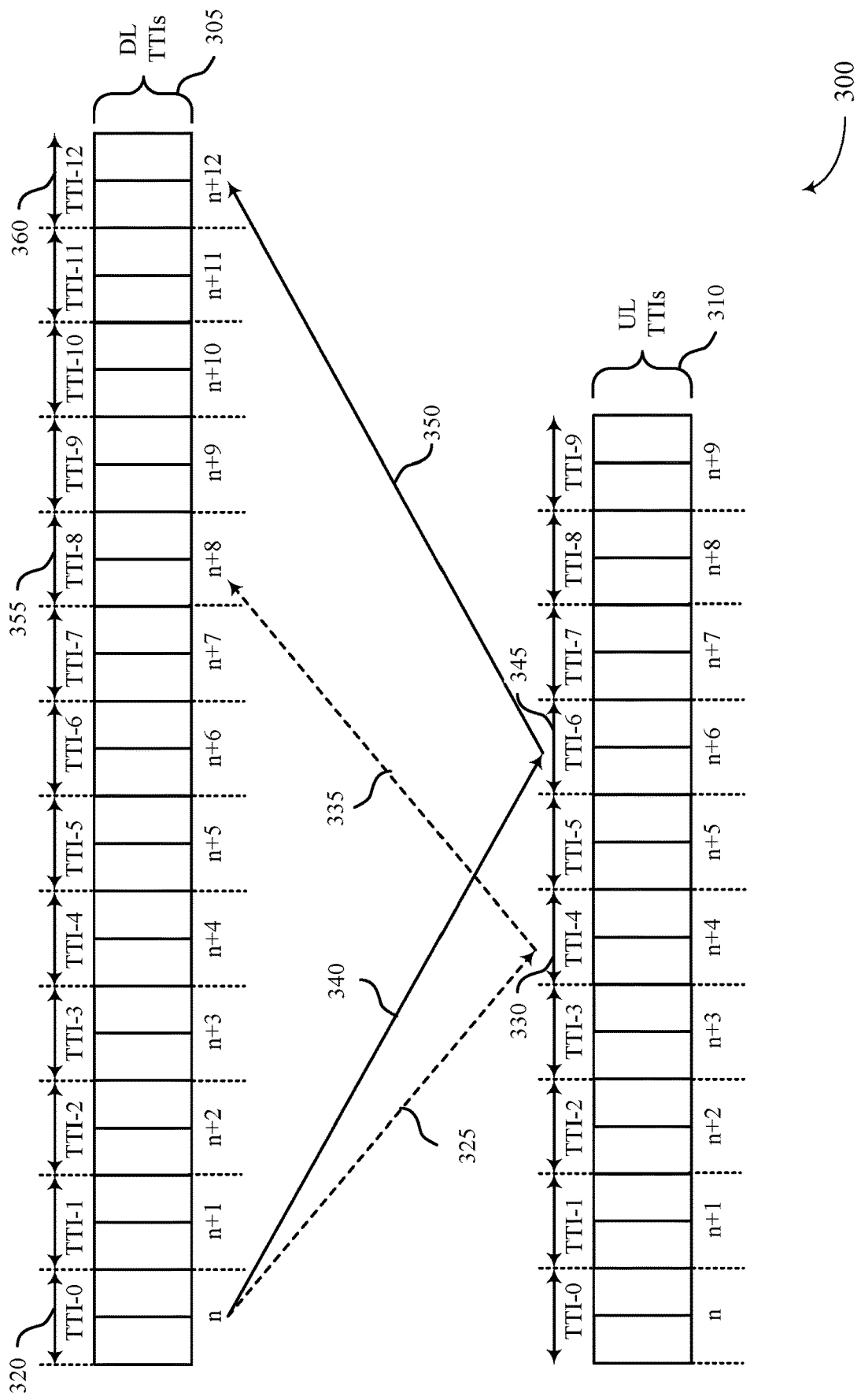
FIG. 3 illustrates example uplink and downlink transmission time intervals (TTIs) that support feedback processing techniques in wireless transmissions in accordance with aspects of the present disclosure.

FIG. 3 illustrates an example of uplink and downlink TTIs 300 in accordance with various aspects of the present disclosure. Uplink and downlink TTIs 300 may be used for communications between a UE 115 and a base station 105 such as discussed above with reference to FIGS. 1 and 2. In this example, downlink TTIs 305 may be used for downlink transmissions from a base station 105 to a UE 115. Similarly, uplink TTIs 310 may be used for uplink transmissions from a UE 115 to a base station 105. Uplink and downlink TTIs 300 illustrate aspects of n+4 timing and n+6 timing, as described above. As illustrated, uplink and downlink TTIs 300 each contain two slots.

As an example, a first downlink TTI 320 may be transmitted to a UE 115, and the UE 115 may attempt to demodulate and decode the transmission and generate an ACK/NACK indication 325 that may be transmitted in uplink TTI 330, which may be a first uplink TTI that starts at or after n+4 TTIs after the first downlink TTI 320. In the event that the ACK/NACK indication is a NACK, the base station may format a rescheduling and retransmission 335 to the UE, which may be transmitted in a first downlink TTI that starts at or after n+4 TTIs after the ACK/NACK indication 325, which in this example is downlink TTI-8 355. Thus, a round trip time (RTT) in such a case is 8 TTIs. Similarly, ACK/NACK feedback for downlink TTI-1 may be transmitted in uplink TTI-5, ACK/NACK feedback for downlink TTI-2 may be transmitted in uplink TTI-6, and so on.

As a second example, a first downlink TTI 320 may be transmitted to a UE 115, and the UE 115 may attempt to demodulate and decode the transmission and generate an ACK/NACK indication 340 that may be transmitted in uplink TTI-6 345, which may be a first uplink TTI that starts at or after n+6 TTIs after the first downlink TTI 320. In the event that the ACK/NACK indication is a NACK, the base station may format a rescheduling and retransmission 350 to the UE, which may be transmitted in a first downlink TTI that starts at or after n+6 TTIs after the ACK/NACK indication 340, which in this example is downlink TTI-12 360, thereby providing a RTT of 12 TTIs.

As discussed above, in cases where a deployment may benefit from allowing low latency communications with a maximum TA that, coupled with UE processing capabilities and propagation delays associated with transmissions may otherwise not allow for provision of such a low latency service. In some cases, additional HARQ processes may be dynamically configured at UE 115-a such that the HARQ processing may be performed. In some cases, a processing timeline also may be adjusted based on UE capability.

Figure 4:
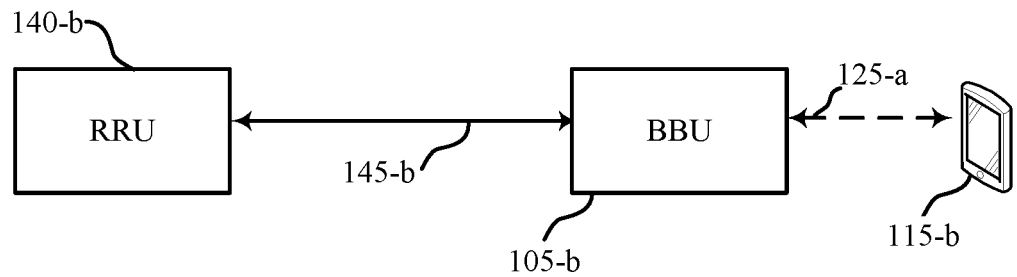
FIG. 4 illustrates an example of a remote radio unit (RRU) and baseband unit (BBU) and related propagation delays in accordance with aspects of the present disclosure.
Figure 4:
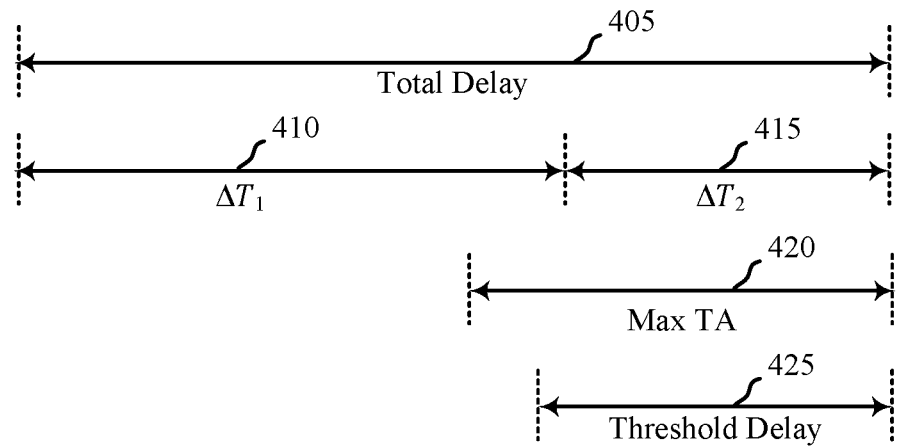

FIG. 4 illustrates an example of a system 400 with a RRU and BBU, and related propagation delays, in accordance with various aspects of the present disclosure. In some examples, system 400 may implement aspects of wireless communication system 100. System 400 may be an example of a portion of a C-RAN deployment, for example.

In this example, a RRU 140-b may be connected with a BBU 105-b (which may be an example of a base station 105) or a network BBU device via, for example, a fiber connection 145-b. The BBU 105-b may transmit and receive wireless transmissions to and from UE 115-b via communications link 125-a. In some C-RAN deployments, RRU 140-b may be connected to multiple BBUs, and each BBU may serve multiple UEs 115 in its coverage area. A total delay 405 may include a first delay 410 associated with the fiber connection 145-b and a second delay 415 associated with the communications link 125-a. In this example, an effective maximum TA in such a deployment is $\Delta T1 + \Delta T2$, or a combined maximum that includes propagation delays of both the connection 145-b and the communications link 125-a. In some cases, a maximum TA 420 may be specified based on a service type, for example. In some cases, the length of the fiber connection 145-b may be relatively long and result in a $\Delta T_1$ that may be relatively large, e.g., up to 200 µs (e.g., in deployments that have tens of kilometers between the BBU 105-b and RRU 140-b). Based on a coverage area for BBU 105-b, $\Delta T_2$ could be tens of µs. The net effect is that the overall TA from the total delay 405 could be large, which may imposes some burden on UE 115-b processing. In some cases, if the second delay 415 associated with communications link 125-a is below a threshold delay 425, a first number of HARQ processes may be configured, and if the second delay 415 is at or above the threshold delay 425, a second number of HARQ processes may be configured that is larger than the first number of HARQ processes. In some cases, irrespective of the timeline, the number of HARQ processes is greater or equal to 2*k, where k may be defined as discussed above (e.g., 16 HARQ processes for n+4 and n+6, and in such cases the number of HARQ processes may be fixed and not configurable).

As discussed above, in some cases, the UE 115-b may be configured a processing timeline with n+k when k may be defined as discussed above, for each service type, and the maximum TA may be defined only based on $\Delta T_2$ 415. For example, a small TA value such as 67 us can be chosen in all cases, and a HARQ processing timeline may be n+4 or n+6 for a 2-symbol TTI operation. In some cases, in order to compensate for $\Delta T_1$ a number of HARQ processes may be increased. For example, if $\Delta T_1$=200 μs, and 2-symbol TTIs are used, two additional HARQ processes are needed, as a 2-symbol TTI is about 140 μs. For slot and 1 ms TTIs, only one additional HARQ processes may needed. For example, when the processing timing is based on n+4, instead of 8 HARQ processes, 10 HARQ processes may be configured for a 2-symbol operation, and 9 HARQ processes may be configured for the other two cases. In order to accommodate the additional HARQ processes, a 4-bit HARQ ID may be used to identify the HARQ processes. Furthermore, in some cases, additional HARQ processes, up to 16 HARQ processes, may be configured. Thus, instead of forcing UE 115-b to transmit earlier based on a larger TA, a UE 115-b may its UL later based on a smaller TA, but the difference is filled with additional HARQ processes. In some cases, the number of HARQ processes to consider is dependent on the value of $\Delta T_1$.

As discussed above, a number of HARQ processes can be configurable, and under the n+4 processing timing, it could may be either 8 or a new number of HARQ processes (e.g., 10 or up to 16). Such a configuration may be indicated to the UE 115-b either via a higher layer signaling (e.g., RRC signaling) or based on the DCI format signaled in DCI. In some cases, when additional HARQ processes are configured, the number of soft buffers may be defined based on the HARQ timing (e.g. 8 if n+4 is adopted) or determined based on the UE capability (e.g., either 8 or the configured higher number of HARQ processes). Furthermore, the RTT could still be defined based on 2*k (i.e., the k in n+k). For example under n+4 processing timing, the UE 115-b may expect retransmissions starting at the eighth TTI even though 16 HARQs may be configured. In another example, a 2-symbol TTI, the UE 115-b may expect re-transmission at the 10th TTI, but it may happen that some processing can be done faster and the RTT may remain 8 TTIs. In some cases, the BBU 105-b may have all the modulated information and can re-transmit new packets with different redundancy versions (RVs), in which case the RTT may be 2*k as well.

As also discussed above, in some cases, the HARQ timing and TA are defined based on $\Delta T_2$, it is necessary to send the TTIs at the right location from BBU 105-b. For example, each 2-symbol sTTI should be sent at the defined TTI starting points in order to properly align with TTI boundaries. In some cases, the RRU 140-b may estimate $\Delta T_1$ and make sure that each packet arrives at BBU 105-b at the TTI boundary. In other cases, the BBU 105-b may self-adjust such that each packet is transmitted to the UE 115-b at the TTI boundary.

Figure 5:
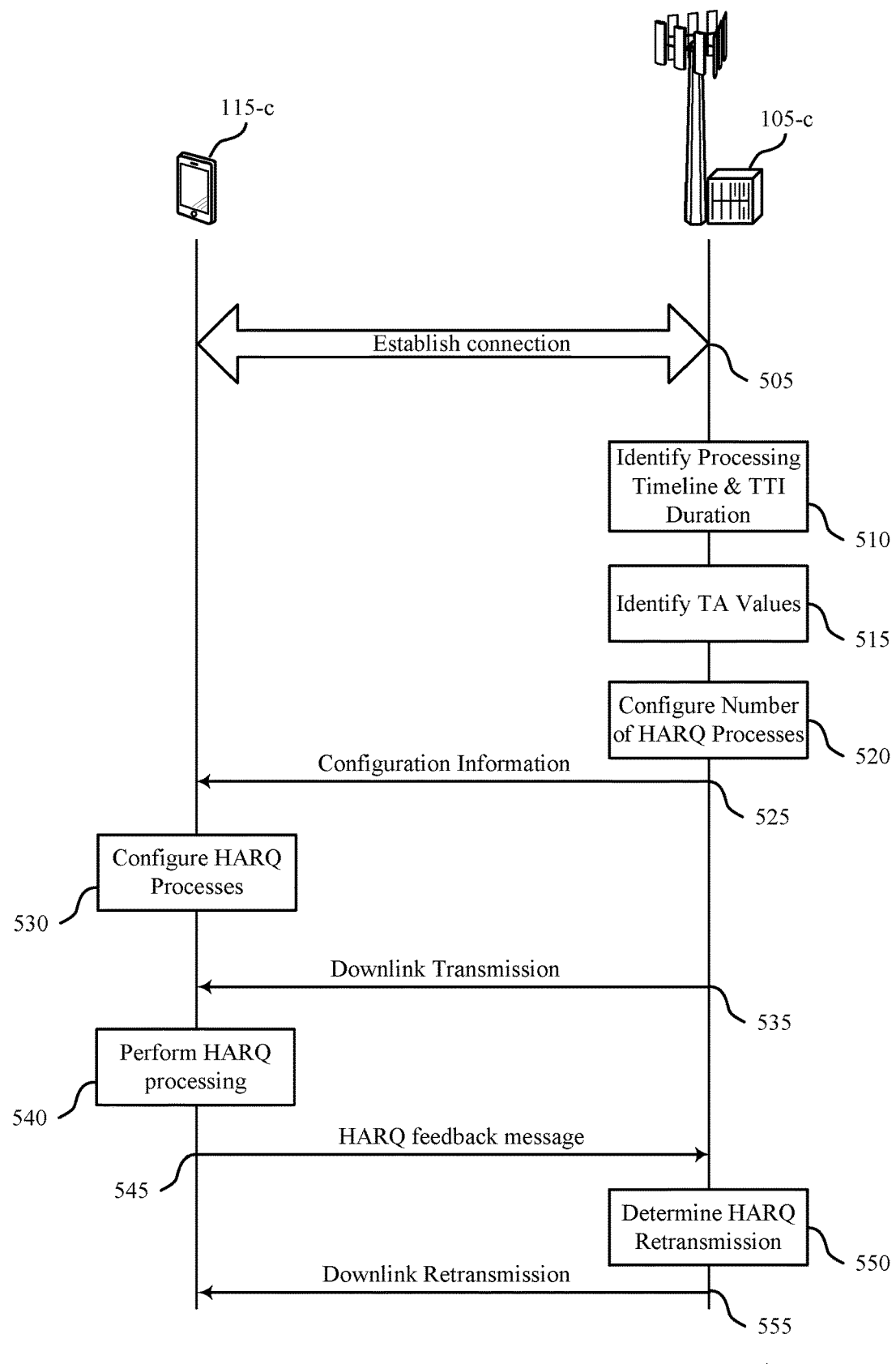
FIG. 5 illustrates an example of a process flow that supports feedback processing techniques in wireless transmissions in accordance with aspects of the present disclosure.

FIG. 5 illustrates an example of a process flow 500 that supports feedback processing techniques in wireless transmissions in accordance with various aspects of the present disclosure. In some examples, process flow 500 may implement aspects of wireless communication system 100. Process flow 500 may include a base station 105-c and a UE 115-c, which may be examples of a base station and UE as discussed above.

At 505, base station 105-c may establish a connection with UE 115-c. The connection established at 505 may be an example of a communication link 125 as described with reference to FIG. 1. In some cases, the wireless communications system within which UE 115-c and base station 105-c establish the connection at 505 may support a first wireless service having a TTI duration that is a 2-symbol or slot TTI. In some examples, the first wireless service may be for HRLLC. In some examples, the first wireless service may additionally or alternatively have a first target latency value and a second wireless service may have a second target latency value that is higher than the first target latency value.

At block 510, base station 105-c may identify a processing timeline and TTI duration for communications with UE 115-c. The processing timeline may be determined based on a TTI duration of the wireless service, and in some examples may also be based on capabilities of the UE 115-c. In some cases, UE 115-c may transmit an indication of its processing capabilities as part of the connection establishment procedure 505, and lower capability UEs may be configured with a larger processing timeline (e.g., an n+6 timeline versus an n+4 timeline).

At block 515, the base station 105-c may identify TA values associated with transmissions to the UE 115-c. The TA values may be identified, for example, based on a reported TA value from the UE 115-c. In some cases, the TA value may be based on two TA values, a first TA value associated with a transmission from a RRU to a BBC, and a second TA value based on propagation delay between the UE 115-c and base station 105-c. In other cases, the TA values may be simply based on a TA value associated with the UE 115-c and base station 105-c, which may be a relatively large TA based on a location of the UE 115-c in coverage area of the base station 105-c.

At block 520, the base station 105-c may configure a number of HARQ processes at the UE 115-c. In some case, the base station 105-c may configure the number of HARQ processes based at least in part on the processing timeline, the TA, a TTI duration, or any combination thereof. Additionally or alternatively, the processing capability of the UE 115-c may also be considered in determining the number of HARQ processes to configure. Furthermore, in some cases, the TA of the UE 115-c may be compared to a threshold propagation delay value, and if the TA is less than the threshold value, a first number of HARQ processes may be configured, and if the TA exceeds the threshold value one or more additional HARQ processes may be configured to allow the UE 115-c additional processing time. The base station 105-c may transmit configuration information 525 to the UE 115-c. In some cases, as indicated above with respect to FIG. 4, a number of HARQ processes may be configured (e.g., 16 HARQ processes) that is greater than a number of HARQ that would be needed for a particular HARQ timeline (e.g., greater than 2 k HARQ processes for an n+k timeline).

The UE 115-c may receive the configuration information 525 and, at block 530, configure HARQ processes. The number of HARQ processes configured at the UE 115-c may be based on information in the configuration information, which may be transmitted using RRC signaling or may be indicated in DCI, for example. The base station 105-c may transmit downlink transmission 535, which may be received at the UE 115-c. The UE 115-c, as part of receiving the downlink transmission 535, may perform HARQ processing at block 540, according to the HARQ configuration. The UE 115-c may transmit HARQ feedback message 545 to the base station 105-e, which may include ACK/NACK information for one or more received TTIs. The base station 105-c may determine, at block 550, whether a retransmission of the downlink transmission is needed, and if so may transmit downlink retransmission 555 to the UE 115-c. In some cases, the RTT for the downlink retransmission 555 may be based on the configured processing timeline irrespective of a number of HARQ processes configured at the UE 115-c.

Figure 6:
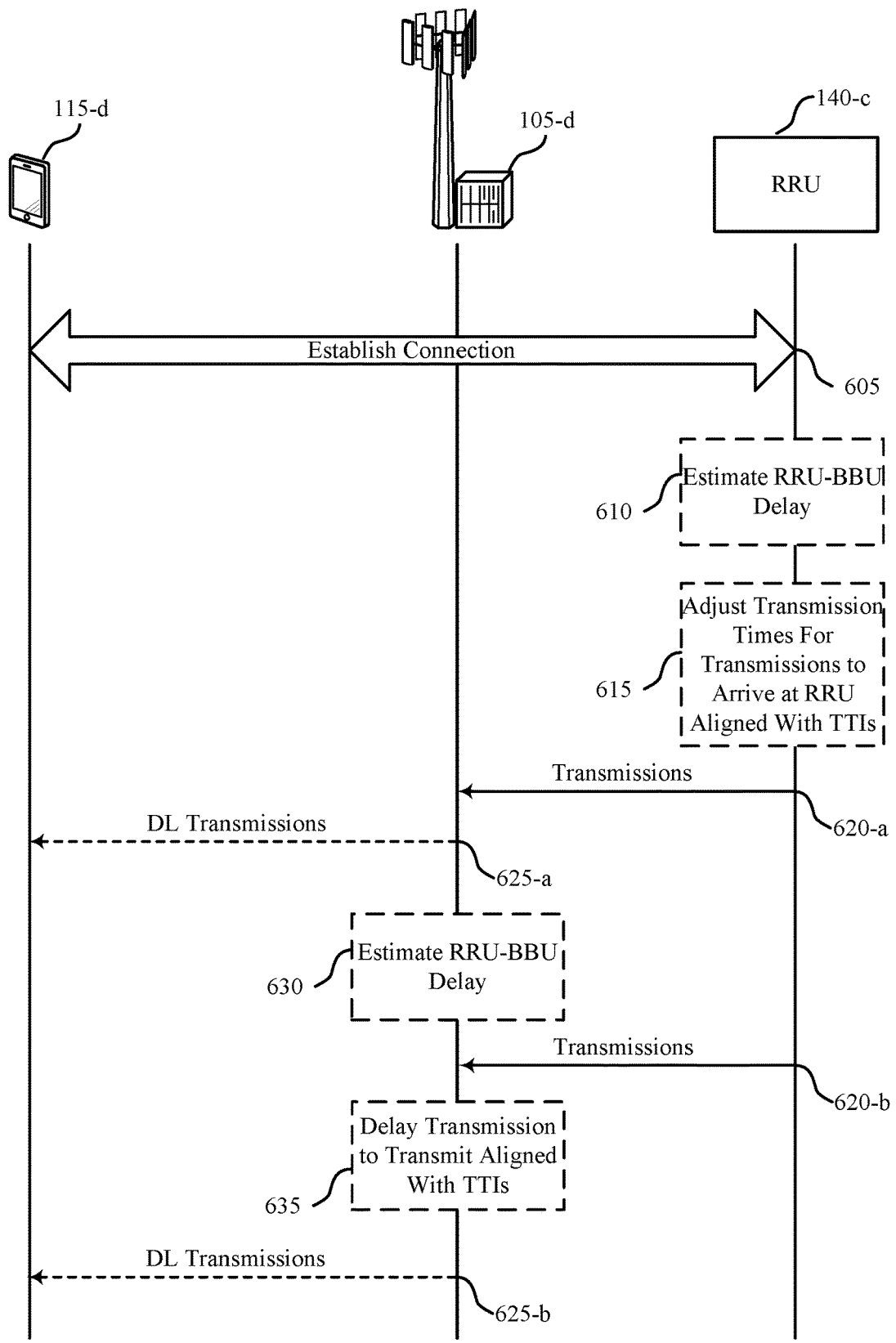
FIG. 6 illustrates an example of a process flow that supports time alignment of wireless transmissions in TTIs in accordance with aspects of the present disclosure.

FIG. 6 illustrates an example of a process flow 600 that supports feedback processing techniques in wireless transmissions in accordance with various aspects of the present disclosure. In some examples, process flow 600 may implement aspects of wireless communication system 100. Process flow 600 may include a base station 105-d, which in this example, may be a BBU, a UE 115-d, and a RRU 140-c, which may be examples of a BBU, RRU, and UE as discussed above.

At block 605, RRU 140-c, via BBU 105-d, may establish a connection with UE 115-d. The connection established at 605 may be an example of a communication link 125 as described with reference to FIG. 1. In some cases, the wireless communications system within which UE 115-d and BBU 105-d establish the connection at 605 may support a first wireless service having a TTI duration that is a 2-symbol or slot TTI. In some examples, the first wireless service may be for HRLLC. In some examples, the first wireless service may additionally or alternatively have a first target latency value and a second wireless service may have a second target latency value that is higher than the first target latency value.

As discussed above, in some cases a maximum TA value at the UE 115-d may be based only on a TA between the UE 115-d and the BBU 105-d. Thus, timing adjustments for the connection between the BBU 105-d and the RRU 140-c may need to be accounted for. As discussed above, such adjustments may be made at either the RRU 140-c or the BBU 105-d.

In examples where adjustments are made at the RRU 140-c, at block 610 the RRU 140-c may estimate a RRU-BBU delay. In some cases, the RRU-BBU delay may be a fixed delay based on a length of a fiber connection that connects the RRU and BBU. In some cases, the delay may be measured at one or both of the RRU 140-c or BBU 105-d, or may be configured. At block 615, the RRU 140-c may adjust transmission times for transmissions such that they arrive at the BBU 105-d aligned with TTIs. The RRU 140-c may transmit downlink transmission 620-a to the BBU 105-d, which may in turn transmit downlink transmission 625-a to the UE 115-d.

In examples where adjustments are made at the BBU 105-d, at block 630 the BBU 105-d may estimate a RRU-BBU delay. In some cases, similarly as discussed above, the RRU-BBU delay may be a fixed delay based on a length of a fiber connection that connects the RRU and BBU. In some cases, the delay may be measured at one or both of the RRU 140-c or BBU 105-d, or may be configured. The BBU 105-d may receive downlink transmission 620-b from the RRU 140-c and, at block 635, the BBU 105-d may delay the transmission to be aligned with a TTI boundary. The BBU 105-d may then transmit downlink transmission 625-b to the UE 115-d.

Figure 7:
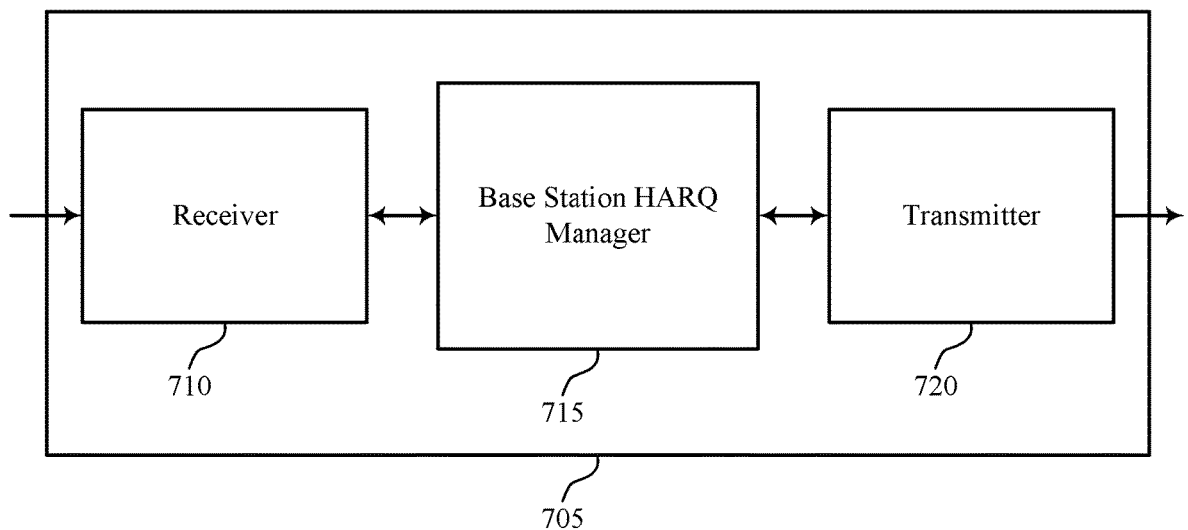
FIGS. 7 through 9 show block diagrams of a device that supports feedback processing techniques in wireless transmissions in accordance with aspects of the present disclosure.

FIG. 7 shows a block diagram 700 of a wireless device 705 that supports feedback processing techniques in wireless transmissions in accordance with aspects of the present disclosure. Wireless device 705 may be an example of aspects of a base station 105 as described with reference to FIG. 1. Wireless device 705 may include receiver 710, base station hybrid automatic repeat request (HARQ) manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to feedback processing techniques in wireless transmissions, etc.). Information may be passed on to other components of the device. The receiver 710 may be an example of aspects of the transceiver 1035 described with reference to FIG. 10. The receiver 710 may utilize a single antenna or a set of antennas.

Base station HARQ manager 715 may be an example of aspects of the base station HARQ manager 1015 described with reference to FIG. 10.

Base station HARQ manager 715 and/or at least some of its various sub-components may be implemented in hardware, software executed by a processor, firmware, or any combination thereof. If implemented in software executed by a processor, the functions of the base station HARQ manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The base station HARQ manager 715 and/or at least some of its various sub-components may be physically located at various positions, including being distributed such that portions of functions are implemented at different physical locations by one or more physical devices. In some examples, base station HARQ manager 715 and/or at least some of its various sub-components may be a separate and distinct component in accordance with various aspects of the present disclosure. In other examples, base station HARQ manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station HARQ manager 715 may identify a processing timeline for a user equipment (UE) to transmit a HARQ feedback transmission in response to a downlink transmission, the processing timeline including a duration of time between the downlink transmission and an uplink transmission that includes the HARQ feedback, determine a configuration establishing a number of HARQ processes for use by the UE, the number of HARQ processes based on the processing timeline, a TA of the UE, and a duration of transmission time interval (TTI)s associated with the HARQ feedback transmission, and transmit the configuration to the UE.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
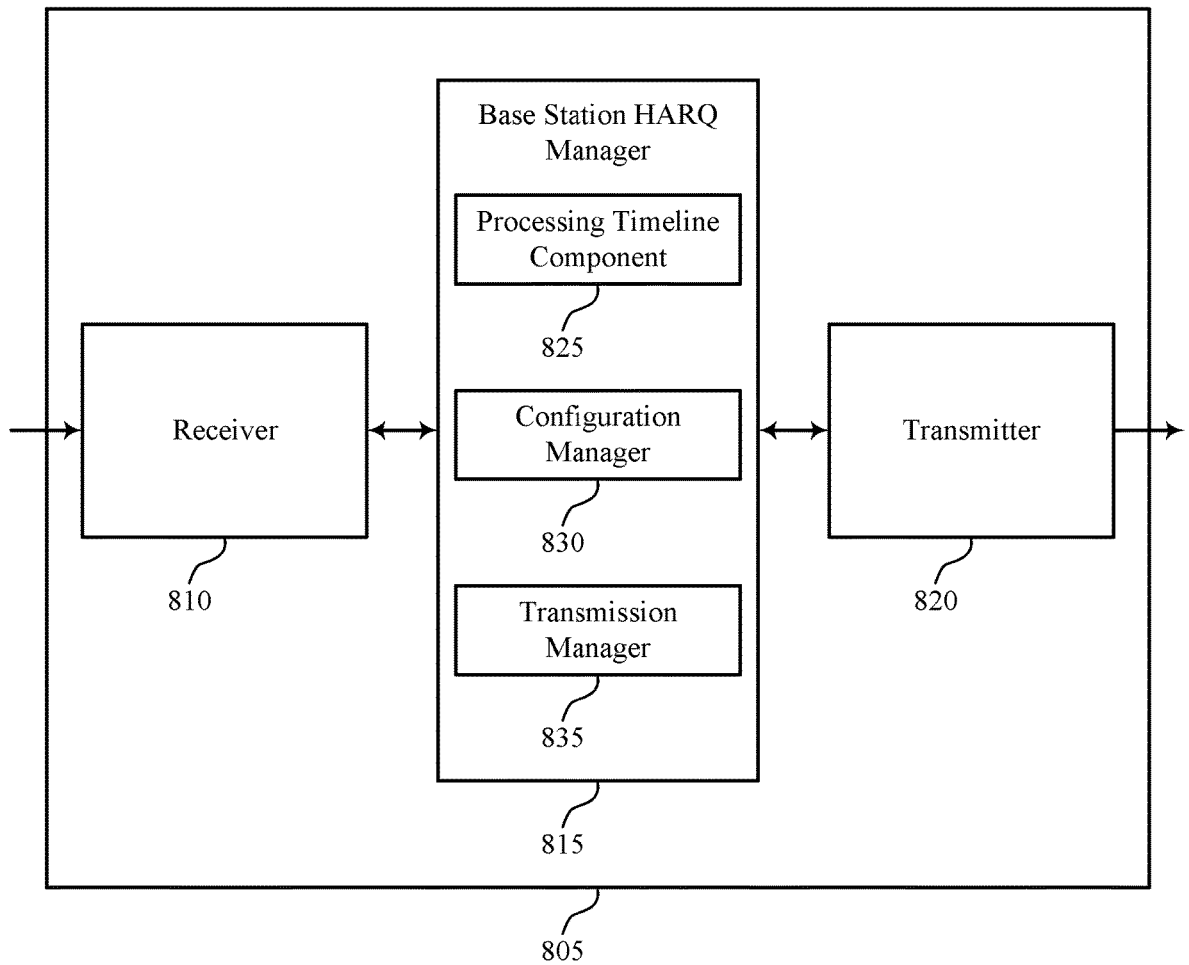

FIG. 8 shows a block diagram 800 of a wireless device 805 that supports feedback processing techniques in wireless transmissions in accordance with aspects of the present disclosure. Wireless device 805 may be an example of aspects of a wireless device 705 or a base station 105 as described with reference to FIG. 7. Wireless device 805 may include receiver 810, base station HARQ manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to feedback processing techniques in wireless transmissions, etc.). Information may be passed on to other components of the device. The receiver 810 may be an example of aspects of the transceiver 1035 described with reference to FIG. 10. The receiver 810 may utilize a single antenna or a set of antennas.

Base station HARQ manager 815 may be an example of aspects of the base station HARQ manager 1015 described with reference to FIG. 10. Base station HARQ manager 815 may also include processing timeline component 825, configuration manager 830, and transmission manager 835.

Processing timeline component 825 may identify a processing timeline for a UE to transmit a HARQ feedback transmission in response to a downlink transmission, the processing timeline including a duration of time between the downlink transmission and an uplink transmission that includes the HARQ feedback.

Configuration manager 830 may determine a configuration establishing a number of HARQ processes for use by the UE, the number of HARQ processes based on the processing timeline, a TA of the UE, a duration of TTIs associated with the HARQ feedback transmission, or any combination thereof. In some cases, the determining the configuration further includes identifying a threshold TA value for setting the number of HARQ processes at the UE, comparing the TA of the UE to the threshold propagation delay value, and setting a first number of HARQ processes or a second number of HARQ processes for use by the UE based on whether the TA of the UE is less than or greater than the threshold propagation delay value, where the first number of HARQ processes is less than the second number of HARQ processes. In some cases, the threshold propagation delay value corresponds to a value of a propagation delay at which the UE is capable of performing HARQ processing using the first number of HARQ processes.

In some cases, a maximum TA value is determined for the UE based on a coverage area of a base station serving the UE. In some cases, the determining the configuration further includes identifying the TA of the UE based on a first TA value for transmissions between the UE and a BBU and a second TA value for transmissions between the BBU and a RRU, and where the number of HARQ processes is based on the second TA value. In some cases, the determining the configuration further includes comparing the second TA value to a threshold TA value, and where the number of HARQ processes is further determined based on the comparing. In some cases, the first TA value is based on a wireless propagation delay between the UE and the BBU and the second TA value is based on a fiber connection propagation delay between the BBU and the RRU. In some cases, the identifying the processing timeline further includes determining a maximum TA value for the UE, and determining the processing timeline based on the maximum TA value. In some cases, the processing timeline is further based on a processing capability of the UE.

Transmission manager 835 may transmit the configuration to the UE. In some cases, the transmitting the configuration to the UE includes transmitting radio resource control (RRC) signaling to the UE or downlink control information (DCI) to the UE that includes configuration information.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
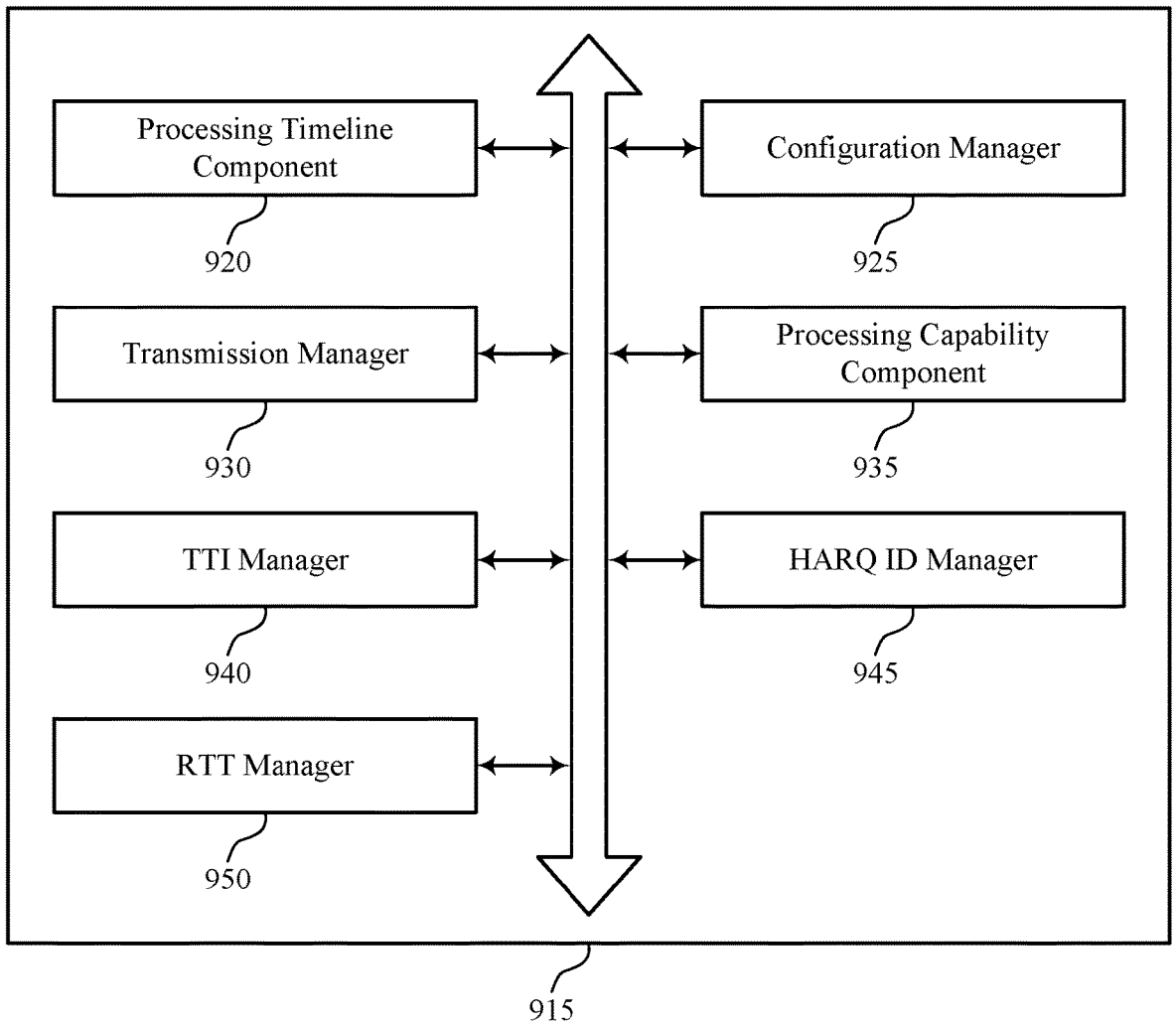

FIG. 9 shows a block diagram 900 of a base station HARQ manager 915 that supports feedback processing techniques in wireless transmissions in accordance with aspects of the present disclosure. The base station HARQ manager 915 may be an example of aspects of a base station HARQ manager 715, a base station HARQ manager 815, or a base station HARQ manager 1015 described with reference to FIGS. 7, 8, and 10. The base station HARQ manager 915 may include processing timeline component 920, configuration manager 925, transmission manager 930, processing capability component 935, TTI manager 940, HARQ ID manager 945, and RTT manager 950. Each of these modules may communicate, directly or indirectly, with one another (e.g., via one or more buses).

Processing timeline component 920 may identify a processing timeline for a UE to transmit a HARQ feedback transmission in response to a downlink transmission, the processing timeline including a duration of time between the downlink transmission and an uplink transmission that includes the HARQ feedback.

Configuration manager 925 may determine a configuration establishing a number of HARQ processes for use by the UE, the number of HARQ processes based on the processing timeline, a TA of the UE, and a duration of TTIs associated with the HARQ feedback transmission. In some cases, the determining the configuration further includes identifying a threshold TA value for setting the number of HARQ processes at the UE, comparing the TA of the UE to the threshold propagation delay value, and setting a first number of HARQ processes or a second number of HARQ processes for use by the UE based on whether the TA of the UE is less than or greater than the threshold propagation delay value, where the first number of HARQ processes is less than the second number of HARQ processes. In some cases, the threshold propagation delay value corresponds to a value of a propagation delay at which the UE is capable of performing HARQ processing using the first number of HARQ processes.

In some cases, a maximum TA value is determined for the UE based on a coverage area of a base station serving the UE. In some cases, the determining the configuration further includes identifying the TA of the UE based on a first TA value for transmissions between the UE and a BBU and a second TA value for transmissions between the BBU and a RRU, and where the number of HARQ processes is based on the second TA value. In some cases, the determining the configuration further includes comparing the second TA value to a threshold TA value, and where the number of HARQ processes is further determined based on the comparing. In some cases, the first TA value is based on a wireless propagation delay between the UE and the BBU and the second TA value is based on a fiber connection propagation delay between the BBU and the RRU. In some cases, the identifying the processing timeline further includes determining a maximum TA value for the UE, and determining the processing timeline based on the maximum TA value. In some cases, the processing timeline is further based on a processing capability of the UE.

Transmission manager 930 may transmit the configuration to the UE. In some cases, the transmitting the configuration to the UE includes transmitting RRC signaling to the UE or DCI to the UE that includes configuration information.

Processing capability component 935 may configure UEs having a greater processing capability with fewer HARQ processes than UEs having lower processing capability. In some cases, the determining the configuration further includes identifying a processing capability of the UE, and determining the number of HARQ processes based on the processing capability of the UE and the TA of the UE. In some cases, the UE reports a UE capability, such as UE class.

TTI manager 940 may manage TTIs based on a TTI duration. In some cases, a first TTI of the first transmission corresponds to a 2-symbol TTI or a slot TTI, and where the processing timeline is based on the TTI duration of the first transmission, and where a second TTI of a second transmission corresponds to a 1-ms TTI and has a different processing timeline, such as a N+3 processing timeline or an N+4 processing timeline.

HARQ ID manager 945 may assign a HARQ ID to different HARQ processes for different TTIs. In some cases, the HARQ feedback transmission is associated with a four-bit HARQ ID.

RTT manager 950 may configure a RTT for the HARQ feedback transmission and an associated retransmission of the downlink transmission, the RTT based on the processing timeline irrespective of the number of HARQ processes. In some cases, the RTT is set based on a TTI duration of the TTI and the number of HARQ processes is based on the processing timeline, the TTI duration, and the TA between the BBU and the RRU.

Figure 10:
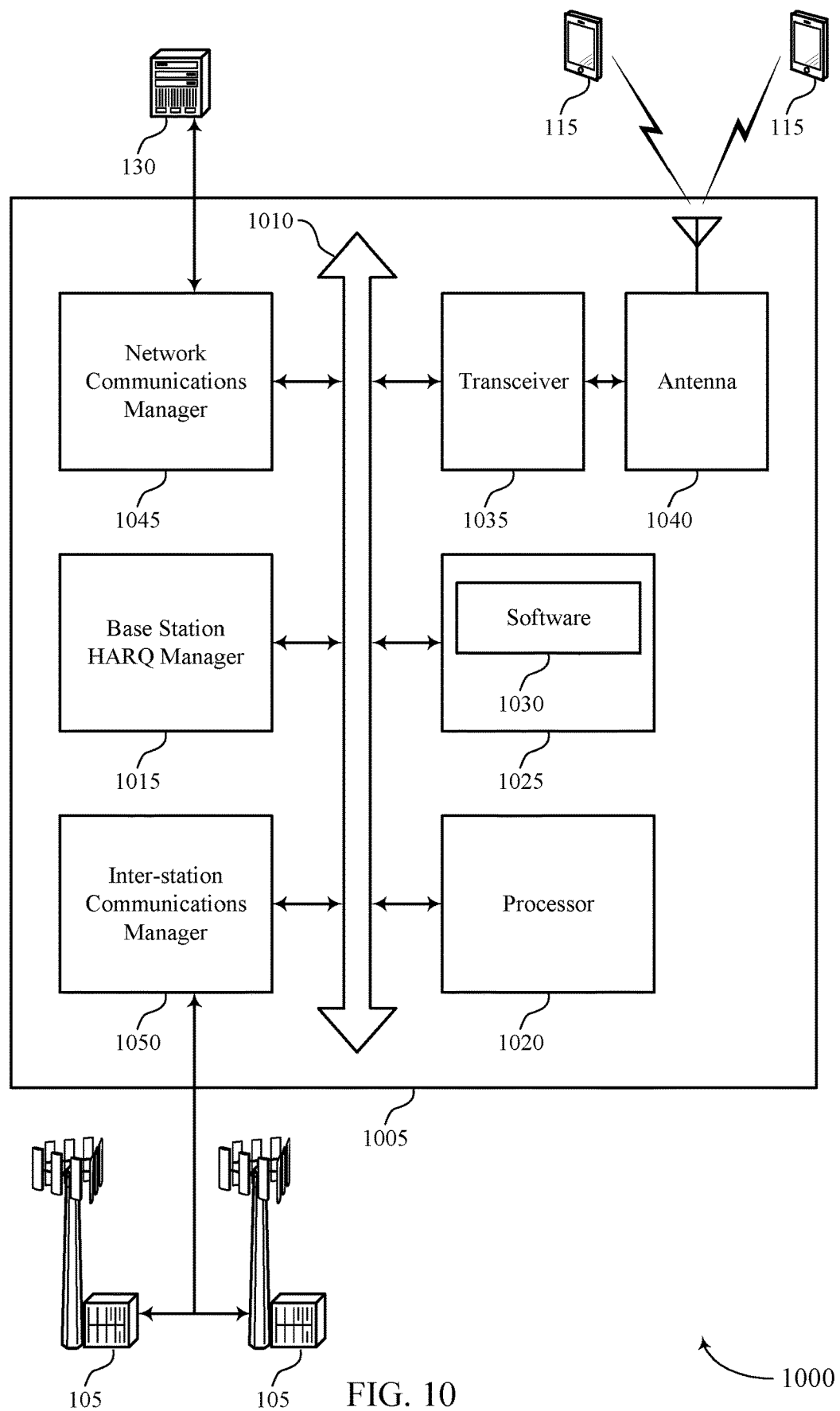
FIG. 10 illustrates a block diagram of a system including a base station that supports feedback processing techniques in wireless transmissions in accordance with aspects of the present disclosure.

FIG. 10 shows a diagram of a system 1000 including a device 1005 that supports feedback processing techniques in wireless transmissions in accordance with aspects of the present disclosure. Device 1005 may be an example of or include the components of wireless device 705, wireless device 805, or a base station 105 as described above, e.g., with reference to FIGS. 7 and 8. Device 1005 may include components for bi-directional voice and data communications including components for transmitting and receiving communications, including base station HARQ manager 1015, processor 1020, memory 1025, software 1030, transceiver 1035, antenna 1040, network communications manager 1045, and inter-station communications manager 1050. These components may be in electronic communication via one or more busses (e.g., bus 1010). Device 1005 may communicate wirelessly with one or more UEs 115.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting feedback processing techniques in wireless transmissions).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware and/or software operation such as the interaction with peripheral components or devices.

Software 1030 may include code to implement aspects of the present disclosure, including code to support feedback processing techniques in wireless transmissions. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

Network communications manager 1045 may manage communications with the core network (e.g., via one or more wired backhaul links). For example, the network communications manager 1045 may manage the transfer of data communications for client devices, such as one or more UEs 115.

Inter-station communications manager 1050 may manage communications with other base station 105, and may include a controller or scheduler for controlling communications with UEs 115 in cooperation with other base stations 105. For example, the inter-station communications manager 1050 may coordinate scheduling for transmissions to UEs 115 for various interference mitigation techniques such as beamforming or joint transmission. In some examples, inter-station communications manager 1050 may provide an X2 interface within an Long Term Evolution (LTE)/LTE-A wireless communication network technology to provide communication between base stations 105.

Figure 11:
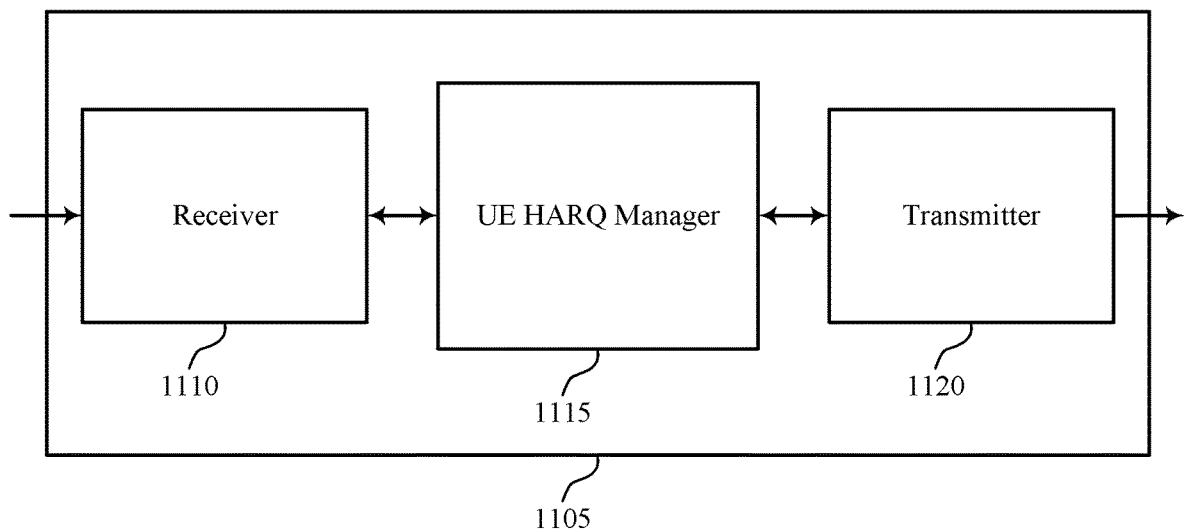
FIGS. 11 through 13 show block diagrams of a device that supports feedback processing techniques in wireless transmissions in accordance with aspects of the present disclosure.

FIG. 11 shows a block diagram 1100 of a wireless device 1105 that supports feedback processing techniques in wireless transmissions in accordance with aspects of the present disclosure. Wireless device 1105 may be an example of aspects of a UE 115 as described with reference to FIG. 1. Wireless device 1105 may include receiver 1110, UE HARQ manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to feedback processing techniques in wireless transmissions, etc.). Information may be passed on to other components of the device. The receiver 1110 may be an example of aspects of the transceiver 1435 described with reference to FIG. 14. The receiver 1110 may utilize a single antenna or a set of antennas. Receiver 1110 may receive the downlink transmission from the base station. In some cases, receiver may receive configuration information via RRC signaling or DCI.

UE HARQ manager 1115 may be an example of aspects of the UE HARQ manager 1415 described with reference to FIG. 14.

UE HARQ manager 1115 and/or at least some of its various sub-components may be implemented in hardware, software executed by a processor, firmware, or any combination thereof. If implemented in software executed by a processor, the functions of the UE HARQ manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE HARQ manager 1115 and/or at least some of its various sub-components may be physically located at various positions, including being distributed such that portions of functions are implemented at different physical locations by one or more physical devices. In some examples, UE HARQ manager 1115 and/or at least some of its various sub-components may be a separate and distinct component in accordance with various aspects of the present disclosure. In other examples, UE HARQ manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE HARQ manager 1115 may identify a TA for transmissions between the UE and a base station, transmit an indication of the TA to the base station, and receive configuration information from the base station that indicates a number of HARQ processes that are to be configured at the UE based on the TA and a duration of TTIs associated with the HARQ processes.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
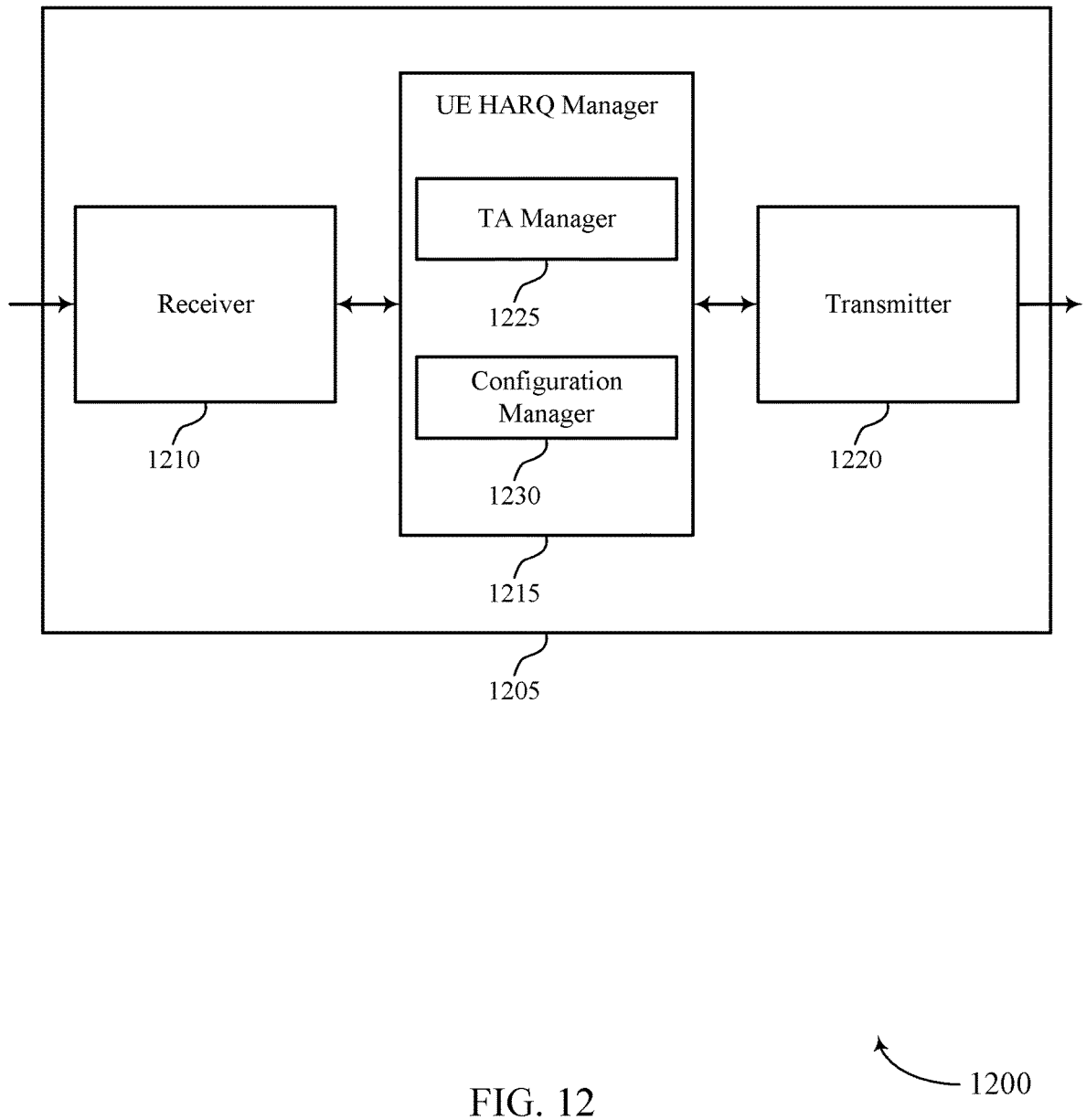

FIG. 12 shows a block diagram 1200 of a wireless device 1205 that supports feedback processing techniques in wireless transmissions in accordance with aspects of the present disclosure. Wireless device 1205 may be an example of aspects of a wireless device 1105 or a UE 115 as described with reference to FIG. 11. Wireless device 1205 may include receiver 1210, UE HARQ manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to feedback processing techniques in wireless transmissions, etc.). Information may be passed on to other components of the device. The receiver 1210 may be an example of aspects of the transceiver 1435 described with reference to FIG. 14. The receiver 1210 may utilize a single antenna or a set of antennas.

UE HARQ manager 1215 may be an example of aspects of the UE HARQ manager 1415 described with reference to FIG. 14. UE HARQ manager 1215 may also include TA manager 1225 and configuration manager 1230.

TA manager 1225 may identify, at a UE, a TA for transmissions between the UE and a base station and transmit an indication of the TA to the base station.

Configuration manager 1230 may receive configuration information from the base station that indicates a number of HARQ processes that are to be configured at the UE based on the TA and a duration of TTIs associated with the HARQ processes. In some cases, the configuration information includes a threshold TA value for setting the number of HARQ processes at the UE, and where the TA may be compared to the threshold propagation delay value, and a first number of HARQ processes or a second number of HARQ processes set based on whether the TA is less than or greater than the threshold propagation delay value, where the first number of HARQ processes is less than the second number of HARQ processes.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
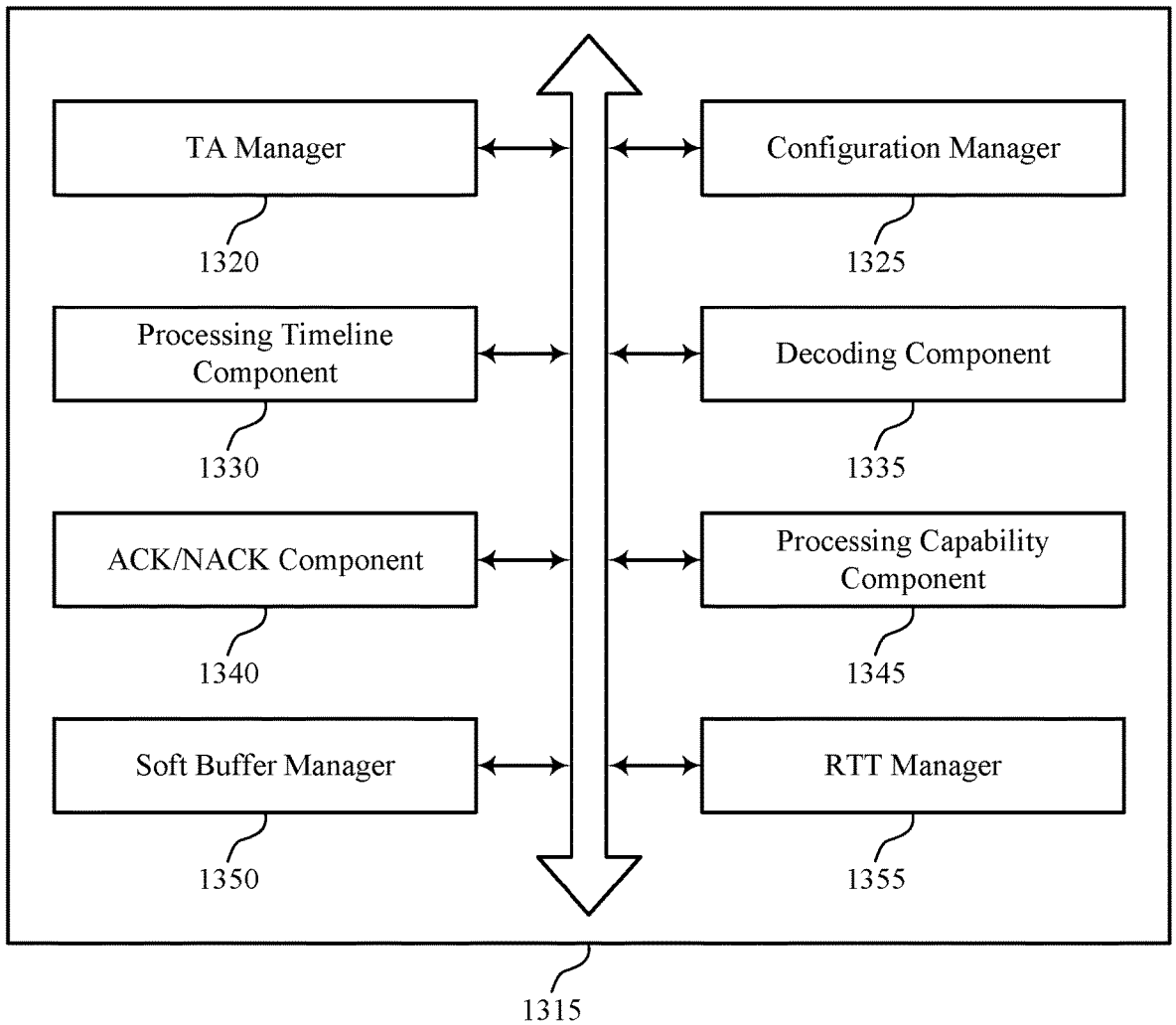

FIG. 13 shows a block diagram 1300 of a UE HARQ manager 1315 that supports feedback processing techniques in wireless transmissions in accordance with aspects of the present disclosure. The UE HARQ manager 1315 may be an example of aspects of a UE HARQ manager 1415 described with reference to FIGS. 11, 12, and 14. The UE HARQ manager 1315 may include TA manager 1320, configuration manager 1325, processing timeline component 1330, decoding component 1335, acknowledgement (ACK)/negative acknowledgement (NACK) component 1340, processing capability component 1345, soft buffer manager 1350, and RTT manager 1355. Each of these modules may communicate, directly or indirectly, with one another (e.g., via one or more buses).

TA manager 1320 may identify, at a UE, a TA for transmissions between the UE and a base station and transmit an indication of the TA to the base station.

Configuration manager 1325 may receive configuration information from the base station that indicates a number of HARQ processes that are to be configured at the UE based on the TA and a duration of TTIs associated with the HARQ processes. In some cases, the configuration information includes a threshold TA value for setting the number of HARQ processes at the UE, and the TA may be compared to the threshold propagation delay value, and a first number of HARQ processes or a second number of HARQ processes set based on whether the TA is less than or greater than the threshold propagation delay value, where the first number of HARQ processes is less than the second number of HARQ processes.

Processing timeline component 1330 may receive a processing timeline in the configuration information, the processing timeline including a duration of time between a downlink transmission from the base station and an uplink transmission to the base station that includes HARQ feedback, the processing timeline based on the duration of the TTIs. In some cases, the processing timeline is based on a maximum TA value for the UE. In some cases, the processing timeline is further based on a processing capability of the UE.

Decoding component 1335 may process the downlink transmission according to a first HARQ process to generate ACK/NACK feedback, the first HARQ process associated with a four-bit HARQ ID. ACK/NACK component 1340 may transmit the ACK/NACK feedback according to the processing timeline.

Processing capability component 1345 may transmit an indication of a processing capability of the UE to the base station, and where the number of HARQ processes is further based on the processing capability. Soft buffer manager 1350 may configure a set of soft buffers for buffering received transmissions associated with one or more of the HARQ processes, a number of the soft buffers based on a number of TTIs in a processing timeline or the number of HARQ processes.

RTT manager 1355 may manage RTTs for different transmissions. In some cases, the configuration information further includes an indication of a RTT for HARQ feedback transmissions and associated retransmissions, the RTT based on a processing timeline for HARQ feedback and irrespective of the number of HARQ processes.

Figure 14:
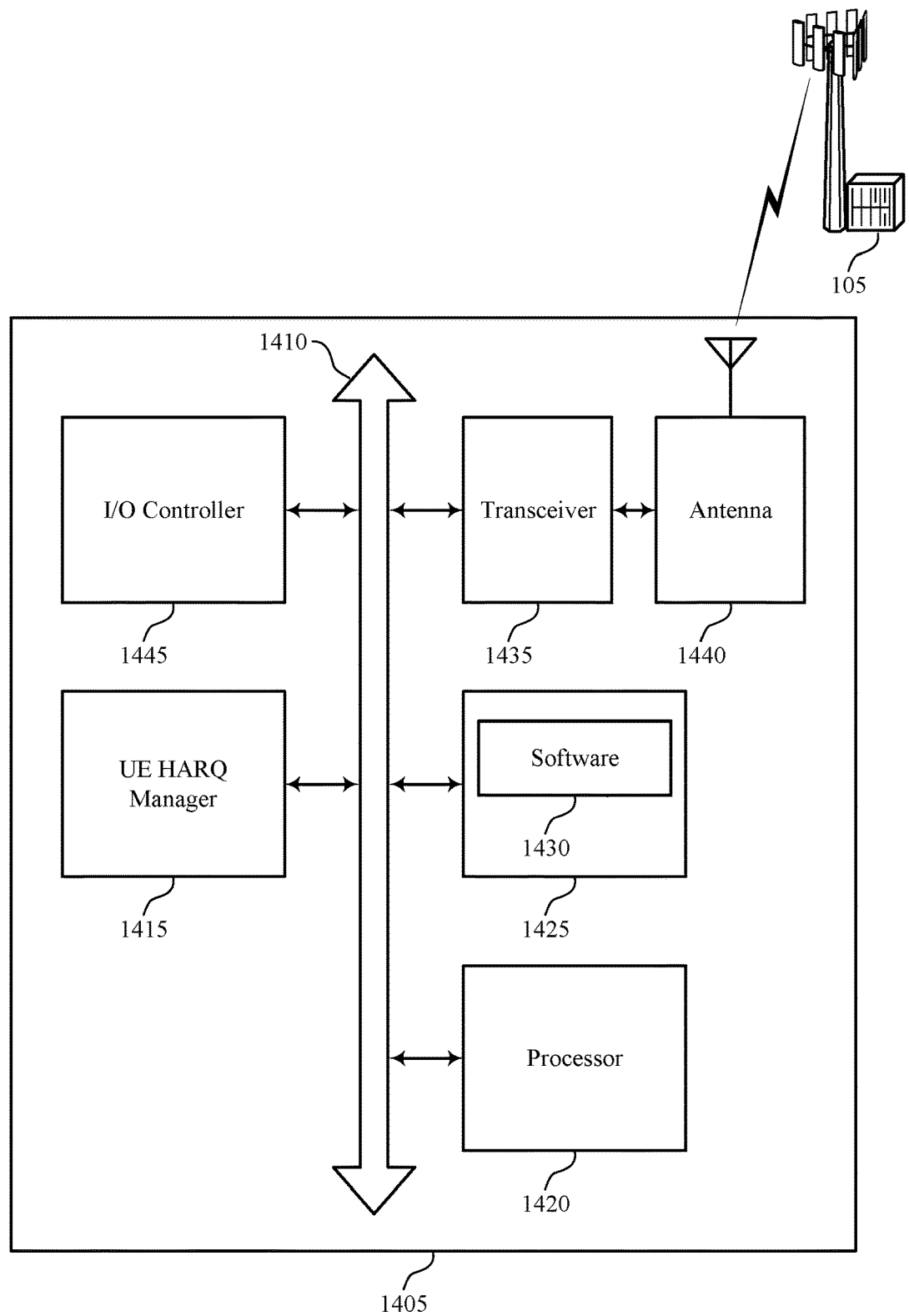
FIG. 14 illustrates a block diagram of a system including a UE that supports feedback processing techniques in wireless transmissions in accordance with aspects of the present disclosure.

FIG. 14 shows a diagram of a system 1400 including a device 1405 that supports feedback processing techniques in wireless transmissions in accordance with aspects of the present disclosure. Device 1405 may be an example of or include the components of UE 115 as described above, e.g., with reference to FIG. 1. Device 1405 may include components for bi-directional voice and data communications including components for transmitting and receiving communications, including UE HARQ manager 1415, processor 1420, memory 1425, software 1430, transceiver 1435, antenna 1440, and I/O controller 1445. These components may be in electronic communication via one or more busses (e.g., bus 1410). Device 1405 may communicate wirelessly with one or more base stations 105.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting feedback processing techniques in wireless transmissions).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware and/or software operation such as the interaction with peripheral components or devices.

Software 1430 may include code to implement aspects of the present disclosure, including code to support feedback processing techniques in wireless transmissions. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

I/O controller 1445 may manage input and output signals for device 1405. I/O controller 1445 may also manage peripherals not integrated into device 1405. In some cases, I/O controller 1445 may represent a physical connection or port to an external peripheral. In some cases, I/O controller 1445 may utilize an operating system such as iOS®, ANDROID®, MS-DOS®, MS-WINDOWS®, OS/2®, UNIX®, LINUX®, or another known operating system. In other cases, I/O controller 1445 may represent or interact with a modem, a keyboard, a mouse, a touchscreen, or a similar device. In some cases, I/O controller 1445 may be implemented as part of a processor. In some cases, a user may interact with device 1405 via I/O controller 1445 or via hardware components controlled by I/O controller 1445.

Figure 15:
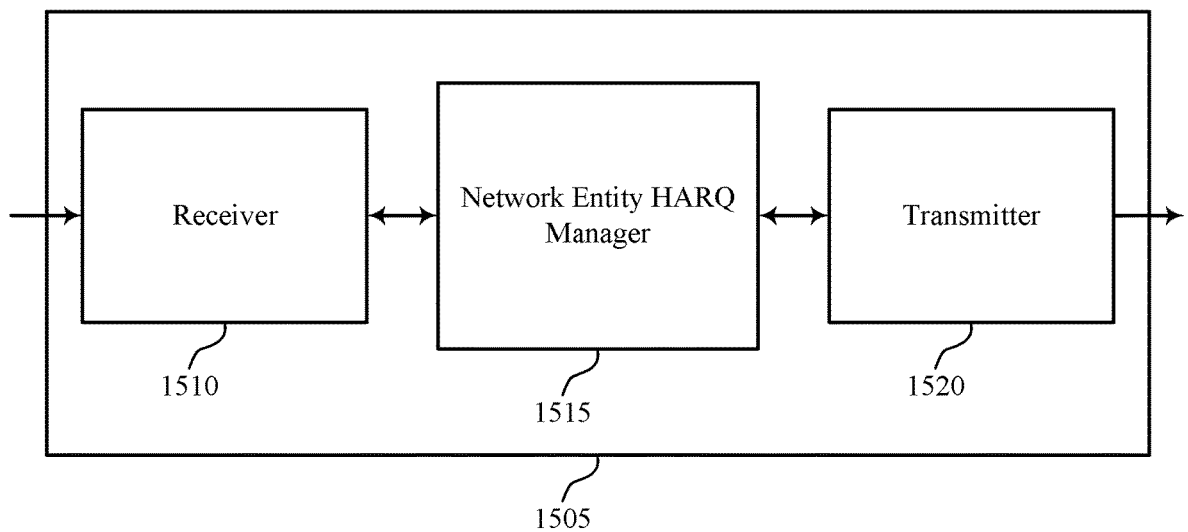
FIGS. 15 through 17 show block diagrams of a device that supports feedback processing techniques in wireless transmissions in accordance with aspects of the present disclosure.

FIG. 15 shows a block diagram 1500 of a wireless device 1505 that supports feedback processing techniques in wireless transmissions in accordance with aspects of the present disclosure. Wireless device 1505 may be an example of aspects of a network entity RRU 140 or BBU as described with reference to FIG. 1. Wireless device 1505 may include receiver 1510, network entity HARQ manager 1515, and transmitter 1520. Wireless device 1505 may also include a processor. Each of these components may be in communication with one another (e.g., via one or more buses).

Receiver 1510 may receive information such as packets, user data, or control information associated with various information channels (e.g., control channels, data channels, and information related to feedback processing techniques in wireless transmissions, etc.). Information may be passed on to other components of the device. The receiver 1510 may be an example of aspects of the transceiver 1835 described with reference to FIG. 18. The receiver 1510 may utilize a single antenna or a set of antennas.

Network entity HARQ manager 1515 may be an example of aspects of the network entity HARQ manager 1815 described with reference to FIG. 18.

Network entity HARQ manager 1515 and/or at least some of its various sub-components may be implemented in hardware, software executed by a processor, firmware, or any combination thereof. If implemented in software executed by a processor, the functions of the network entity HARQ manager 1515 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The network entity HARQ manager 1515 and/or at least some of its various sub-components may be physically located at various positions, including being distributed such that portions of functions are implemented at different physical locations by one or more physical devices. In some examples, network entity HARQ manager 1515 and/or at least some of its various sub-components may be a separate and distinct component in accordance with various aspects of the present disclosure. In other examples, network entity HARQ manager 1515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Network entity HARQ manager 1515 may identify, at a central network node, a time delay associated with a first transmission from the central network node to a BBU, where the first transmission is to be transmitted from the BBU to a UE over a wireless communications link, adjust a transmission time of the first transmission based on the time delay to provide that the first transmission arrives at the BBU for transmission to the UE at a start of a first TTI associated with the first transmission, and transmit the first transmission to the BBU according to the adjusted transmission time.

The network entity HARQ manager 1515 may also receive, at a BBU, a first transmission from a central network node, where the first transmission is to be transmitted from the BBU to a UE over a wireless communications link, identify a time delay associated with the first transmission from the central network node, adjust a transmission time for transmitting the first transmission to the UE based on the time delay to align a start of the first transmission with a starting boundary of a first TTI associated with the first transmission, and transmit the first transmission to the UE according to the adjusted transmission time.

Transmitter 1520 may transmit signals generated by other components of the device. In some examples, the transmitter 1520 may be collocated with a receiver 1510 in a transceiver module. For example, the transmitter 1520 may be an example of aspects of the transceiver 1835 described with reference to FIG. 18. The transmitter 1520 may utilize a single antenna or a set of antennas.

Figure 16:
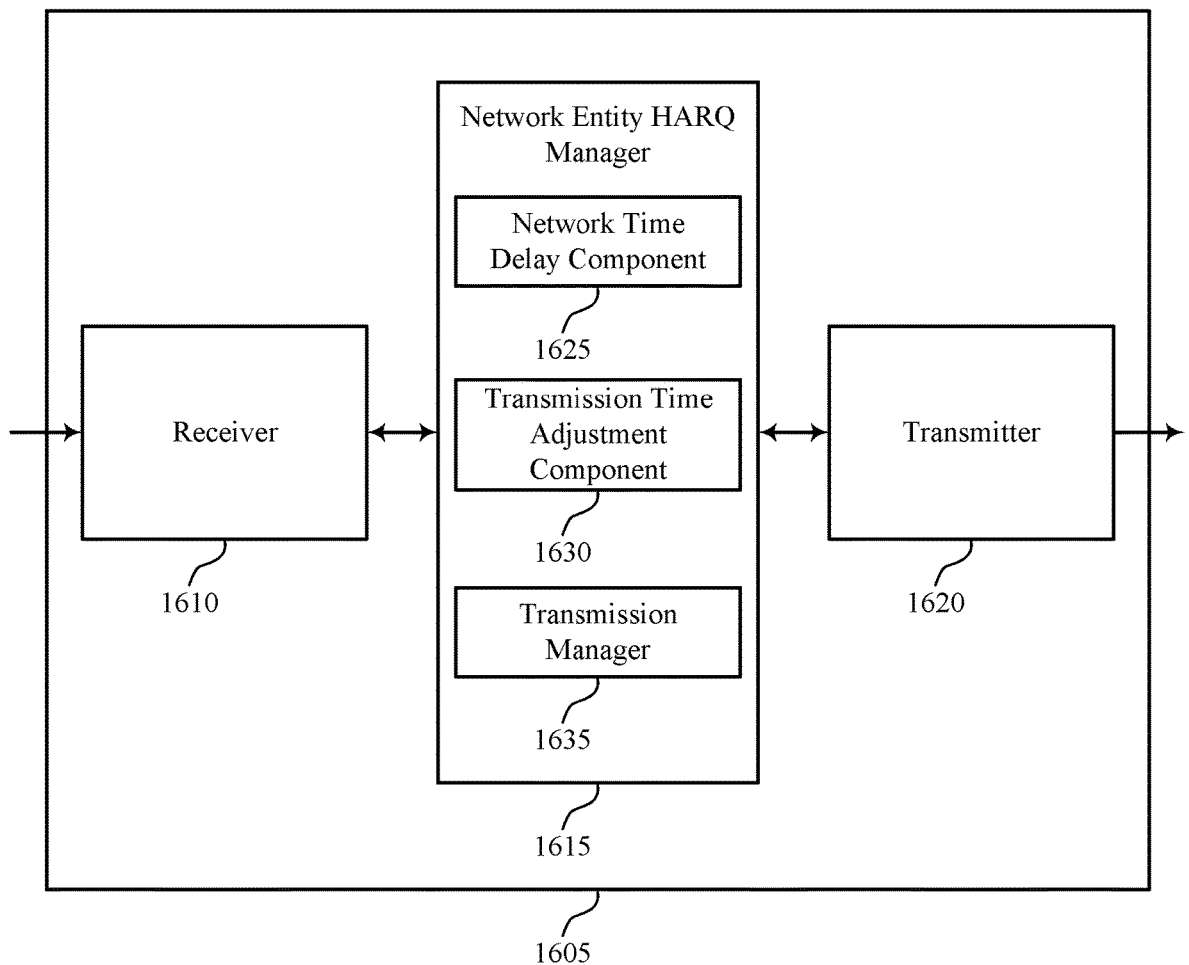

FIG. 16 shows a block diagram 1600 of a wireless device 1605 that supports feedback processing techniques in wireless transmissions in accordance with aspects of the present disclosure. Wireless device 1605 may be an example of aspects of a wireless device 1505 a network entity RRU 140, or a BBU as described with reference to FIG. 15. Wireless device 1605 may include receiver 1610, network entity HARQ manager 1615, and transmitter 1620. Wireless device 1605 may also include a processor. Each of these components may be in communication with one another (e.g., via one or more buses).

Receiver 1610 may receive information such as packets, user data, or control information associated with various information channels (e.g., control channels, data channels, and information related to feedback processing techniques in wireless transmissions, etc.). Information may be passed on to other components of the device. The receiver 1610 may be an example of aspects of the transceiver 1835 described with reference to FIG. 18. The receiver 1610 may utilize a single antenna or a set of antennas.

Network entity HARQ manager 1615 may be an example of aspects of the network entity HARQ manager 1815 described with reference to FIG. 18. Network entity HARQ manager 1615 may also include network time delay component 1625, transmission time adjustment component 1630, and transmission manager 1635.

Network time delay component 1625 may identify, at a central network node, a time delay associated with a first transmission from the central network node to a BBU, where the first transmission is to be transmitted from the BBU to a UE over a wireless communications link and identify a time delay associated with the first transmission from the central network node. In some cases, the time delay is associated with a propagation delay of a fiber connection between the central network node and the BBU. In some cases, the time delay is associated with a propagation delay of a fiber connection between the central network node and the BBU.

Transmission time adjustment component 1630 may adjust a transmission time of the first transmission based on the time delay to provide that the first transmission arrives at the BBU for transmission to the UE at a start of a first TTI associated with the first transmission and adjust a transmission time for transmitting the first transmission to the UE based on the time delay to align a start of the first transmission with a starting boundary of a first TTI associated with the first transmission.

Transmission manager 1635 may transmit the first transmission to the BBU according to the adjusted transmission time, receive, at a BBU, a first transmission from a central network node, where the first transmission is to be transmitted from the BBU to a UE over a wireless communications link, and transmit the first transmission to the UE according to the adjusted transmission time.

Transmitter 1620 may transmit signals generated by other components of the device. In some examples, the transmitter 1620 may be collocated with a receiver 1610 in a transceiver module. For example, the transmitter 1620 may be an example of aspects of the transceiver 1835 described with reference to FIG. 18. The transmitter 1620 may utilize a single antenna or a set of antennas.

Figure 17:
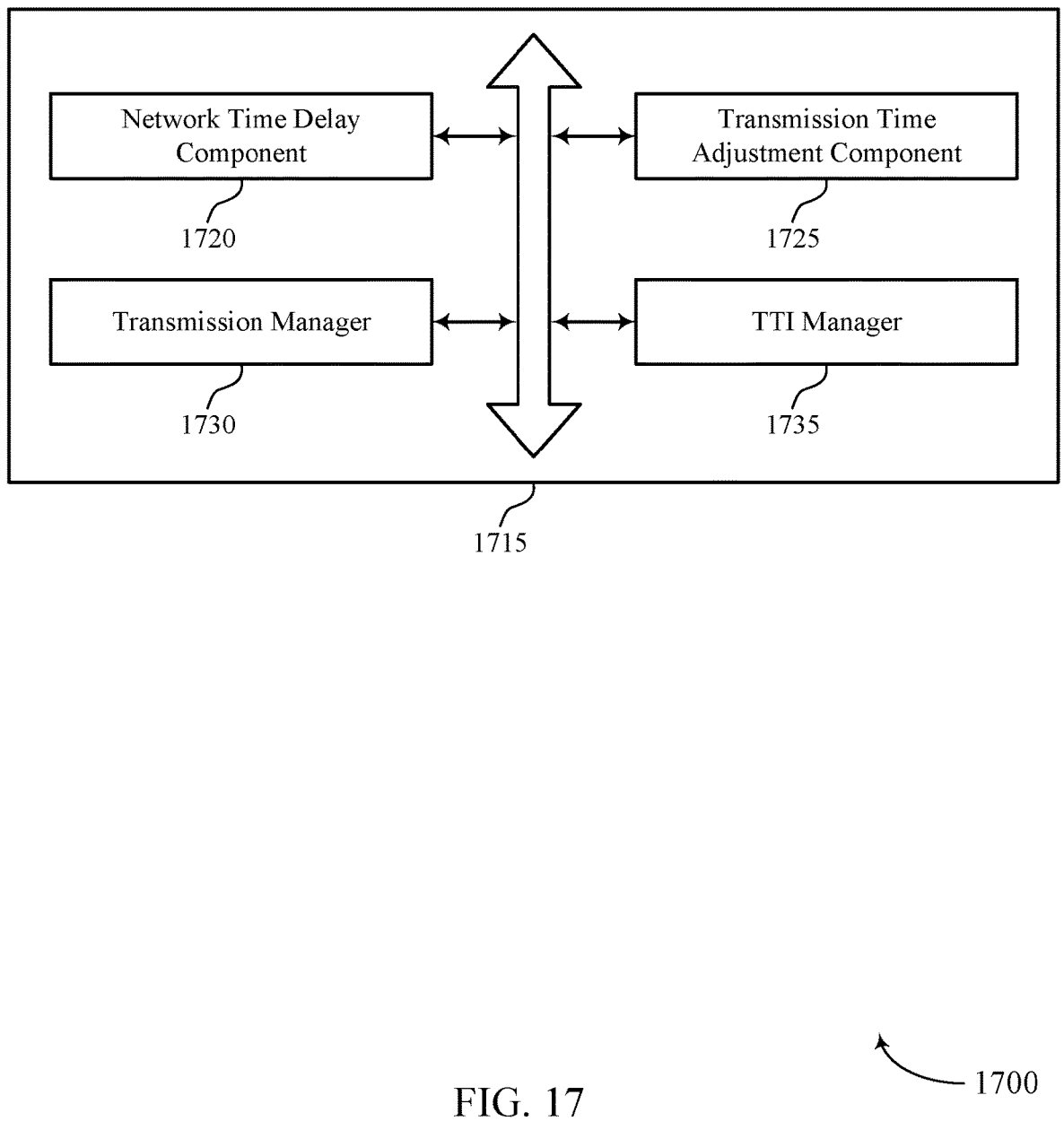

FIG. 17 shows a block diagram 1700 of a network entity HARQ manager 1715 that supports feedback processing techniques in wireless transmissions in accordance with aspects of the present disclosure. The network entity HARQ manager 1715 may be an example of aspects of a network entity HARQ manager 1815 described with reference to FIGS. 15, 16, and 18. The network entity HARQ manager 1715 may include network time delay component 1720, transmission time adjustment component 1725, transmission manager 1730, and TTI manager 1735. Each of these modules may communicate, directly or indirectly, with one another (e.g., via one or more buses).

Network time delay component 1720 may identify, at a central network node, a time delay associated with a first transmission from the central network node to a BBU, where the first transmission is to be transmitted from the BBU to a UE over a wireless communications link and identify a time delay associated with the first transmission from the central network node. In some cases, the time delay is associated with a propagation delay of a fiber connection between the central network node and the BBU. In some cases, the time delay is associated with a propagation delay of a fiber connection between the central network node and the BBU.

Transmission time adjustment component 1725 may adjust a transmission time of the first transmission based on the time delay to provide that the first transmission arrives at the BBU for transmission to the UE at a start of a first TTI associated with the first transmission and adjust a transmission time for transmitting the first transmission to the UE based on the time delay to align a start of the first transmission with a starting boundary of a first TTI associated with the first transmission.

Transmission manager 1730 may transmit the first transmission to the BBU according to the adjusted transmission time, receive, at a BBU, a first transmission from a central network node, where the first transmission is to be transmitted from the BBU to a UE over a wireless communications link, and transmit the first transmission to the UE according to the adjusted transmission time.

TTI manager 1735 may identify a TTI duration for one or more wireless services. In some cases, the first TTI of the first transmission is shorter than a second TTI of a second transmission from the central network node to the BBU. In some cases, the first TTI is a 2-symbol or slot TTI, and the second TTI is a 1-ms TTI. In some cases, the first TTI of the first transmission is shorter than a second TTI of a second transmission from the central network node to the BBU. In some cases, the first TTI is a 2-symbol or slot TTI, and the second TTI is a 1-ms TTI.

Figure 18:
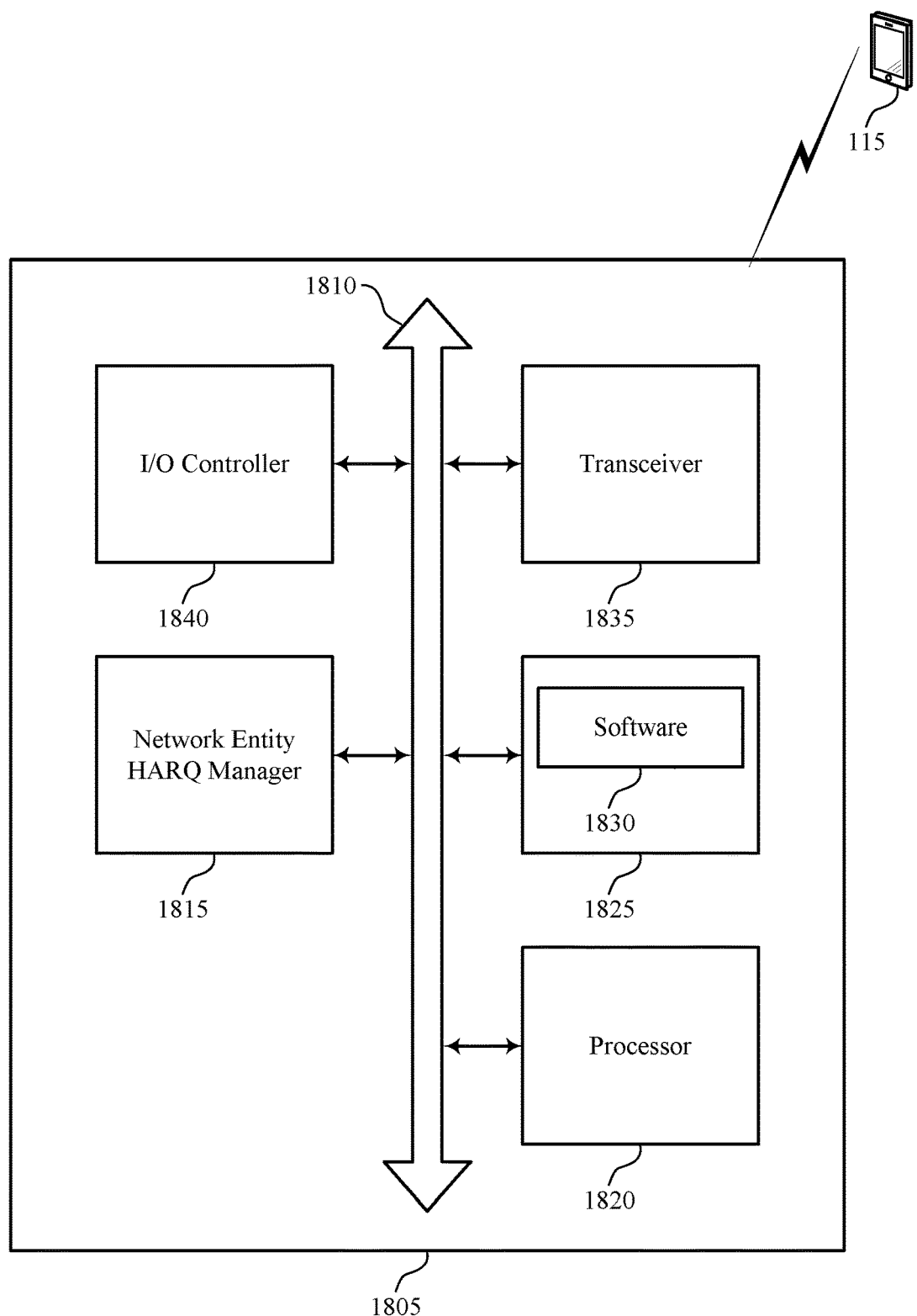
FIG. 18 illustrates a block diagram of a system including a network entity that supports feedback processing techniques in wireless transmissions in accordance with aspects of the present disclosure.

FIG. 18 shows a diagram of a system 1800 including a device 1805 that supports feedback processing techniques in wireless transmissions in accordance with aspects of the present disclosure. Device 1805 may be an example of or include the components of network entity RRU 140 or BBU as described above, e.g., with reference to FIG. 1. Device 1805 may include components for bi-directional voice and data communications including components for transmitting and receiving communications, including network entity HARQ manager 1815, processor 1820, memory 1825, software 1830, transceiver 1835, and I/O controller 1840. These components may be in electronic communication via one or more busses (e.g., bus 1810).

Processor 1820 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1820 may be configured to operate a memory array using a memory controller. In other cases, a memory controller may be integrated into processor 1820. Processor 1820 may be configured to execute computer-readable instructions stored in a memory to perform various functions (e.g., functions or tasks supporting feedback processing techniques in wireless transmissions).

Memory 1825 may include RAM and ROM. The memory 1825 may store computer-readable, computer-executable software 1830 including instructions that, when executed, cause the processor to perform various functions described herein. In some cases, the memory 1825 may contain, among other things, a BIOS which may control basic hardware and/or software operation such as the interaction with peripheral components or devices.

Software 1830 may include code to implement aspects of the present disclosure, including code to support feedback processing techniques in wireless transmissions. Software 1830 may be stored in a non-transitory computer-readable medium such as system memory or other memory. In some cases, the software 1830 may not be directly executable by the processor but may cause a computer (e.g., when compiled and executed) to perform functions described herein.

Transceiver 1835 may communicate bi-directionally, via one or more antennas, wired, or wireless links as described above. For example, the transceiver 1835 may represent a wireless transceiver and may communicate bi-directionally with another wireless transceiver. The transceiver 1835 may also include a modem to modulate the packets and provide the modulated packets to the antennas for transmission, and to demodulate packets received from the antennas.

I/O controller 1840 may manage input and output signals for device 1805. I/O controller 1840 may also manage peripherals not integrated into device 1805. In some cases, I/O controller 1840 may represent a physical connection or port to an external peripheral. In some cases, I/O controller 1840 may utilize an operating system such as iOS®, ANDROID®, MS-DOS®, MS-WINDOWS®, OS/2®, UNIX®, LINUX®, or another known operating system. In other cases, I/O controller 1840 may represent or interact with a modem, a keyboard, a mouse, a touchscreen, or a similar device. In some cases, I/O controller 1840 may be implemented as part of a processor. In some cases, a user may interact with device 1805 via I/O controller 1840 or via hardware components controlled by I/O controller 1840.

Figure 19:
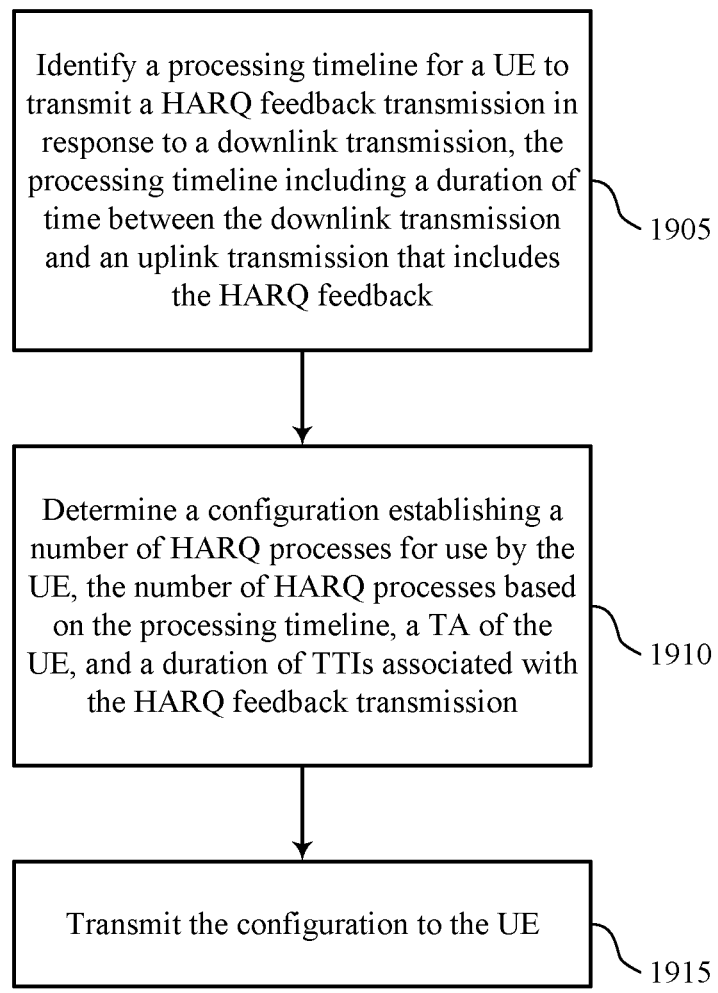
FIGS. 19 through 23 illustrate methods for feedback processing techniques in wireless transmissions in accordance with aspects of the present disclosure.

FIG. 19 shows a flowchart illustrating a method 1900 for feedback processing techniques in wireless transmissions in accordance with aspects of the present disclosure. The operations of method 1900 may be implemented by a base station 105 or its components as described herein. For example, the operations of method 1900 may be performed by a base station HARQ manager as described with reference to FIGS. 7 through 10. In some examples, a base station 105 may execute a set of codes to control the functional elements of the device to perform the functions described below. Additionally or alternatively, the base station 105 may perform aspects of the functions described below using special-purpose hardware.

At block 1905 the base station 105 may identify a processing timeline for a UE to transmit a HARQ feedback transmission in response to a downlink transmission, the processing timeline comprising a duration of time between the downlink transmission and an uplink transmission that includes the HARQ feedback. The operations of block 1905 may be performed according to the methods described herein. In certain examples, aspects of the operations of block 1905 may be performed by a processing timeline component as described with reference to FIGS. 7 through 10.

At block 1910 the base station 105 may determine a configuration establishing a number of HARQ processes for use by the UE, the number of HARQ processes based at least in part on the processing timeline, a TA of the UE, and a duration of TTIs associated with the HARQ feedback transmission. The operations of block 1910 may be performed according to the methods described herein. In certain examples, aspects of the operations of block 1910 may be performed by a configuration manager as described with reference to FIGS. 7 through 10.

At block 1915 the base station 105 may transmit the configuration to the UE. The operations of block 1915 may be performed according to the methods described herein. In certain examples, aspects of the operations of block 1915 may be performed by a transmission manager as described with reference to FIGS. 7 through 10.

Figure 20:
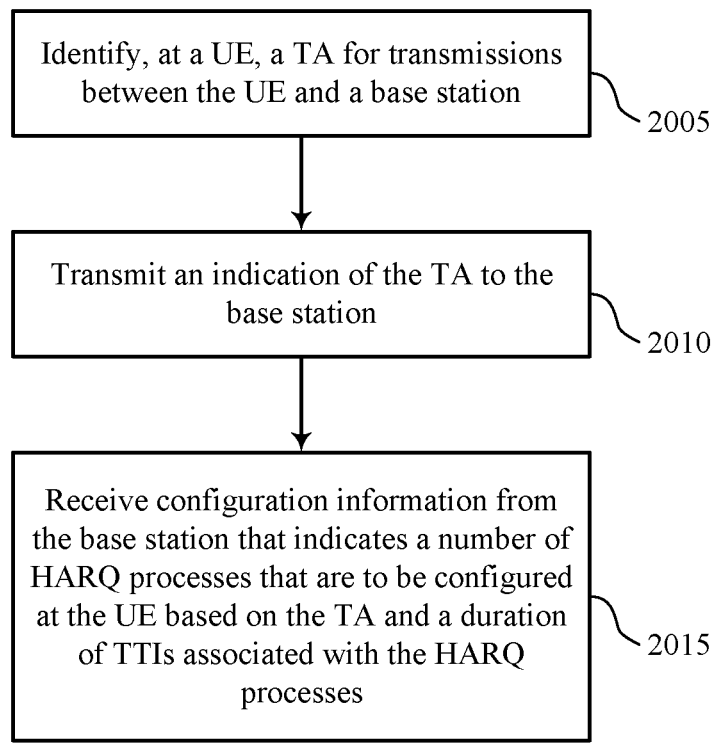

FIG. 20 shows a flowchart illustrating a method 2000 for feedback processing techniques in wireless transmissions in accordance with aspects of the present disclosure. The operations of method 2000 may be implemented by a UE 115 or its components as described herein. For example, the operations of method 2000 may be performed by a UE HARQ manager as described with reference to FIGS. 11 through 14. In some examples, a UE 115 may execute a set of codes to control the functional elements of the device to perform the functions described below. Additionally or alternatively, the UE 115 may perform aspects of the functions described below using special-purpose hardware.

At block 2005 the UE 115 may identify a TA for transmissions between the UE and a base station. The operations of block 2005 may be performed according to the methods described herein. In certain examples, aspects of the operations of block 2005 may be performed by a TA manager as described with reference to FIGS. 11 through 14.

At block 2010 the UE 115 may transmit an indication of the TA to the base station. The operations of block 2010 may be performed according to the methods described herein. In certain examples, aspects of the operations of block 2010 may be performed by a TA manager as described with reference to FIGS. 11 through 14. In some cases, the indication may be a UE capability indication or an indication of timelines that the UE can support.

At block 2015 the UE 115 may receive configuration information from the base station that indicates a number of HARQ processes that are to be configured at the UE based at least in part on the TA and a duration of TTIs associated with the HARQ processes. The operations of block 2015 may be performed according to the methods described herein. In certain examples, aspects of the operations of block 2015 may be performed by a configuration manager as described with reference to FIGS. 11 through 14.

Figure 21:
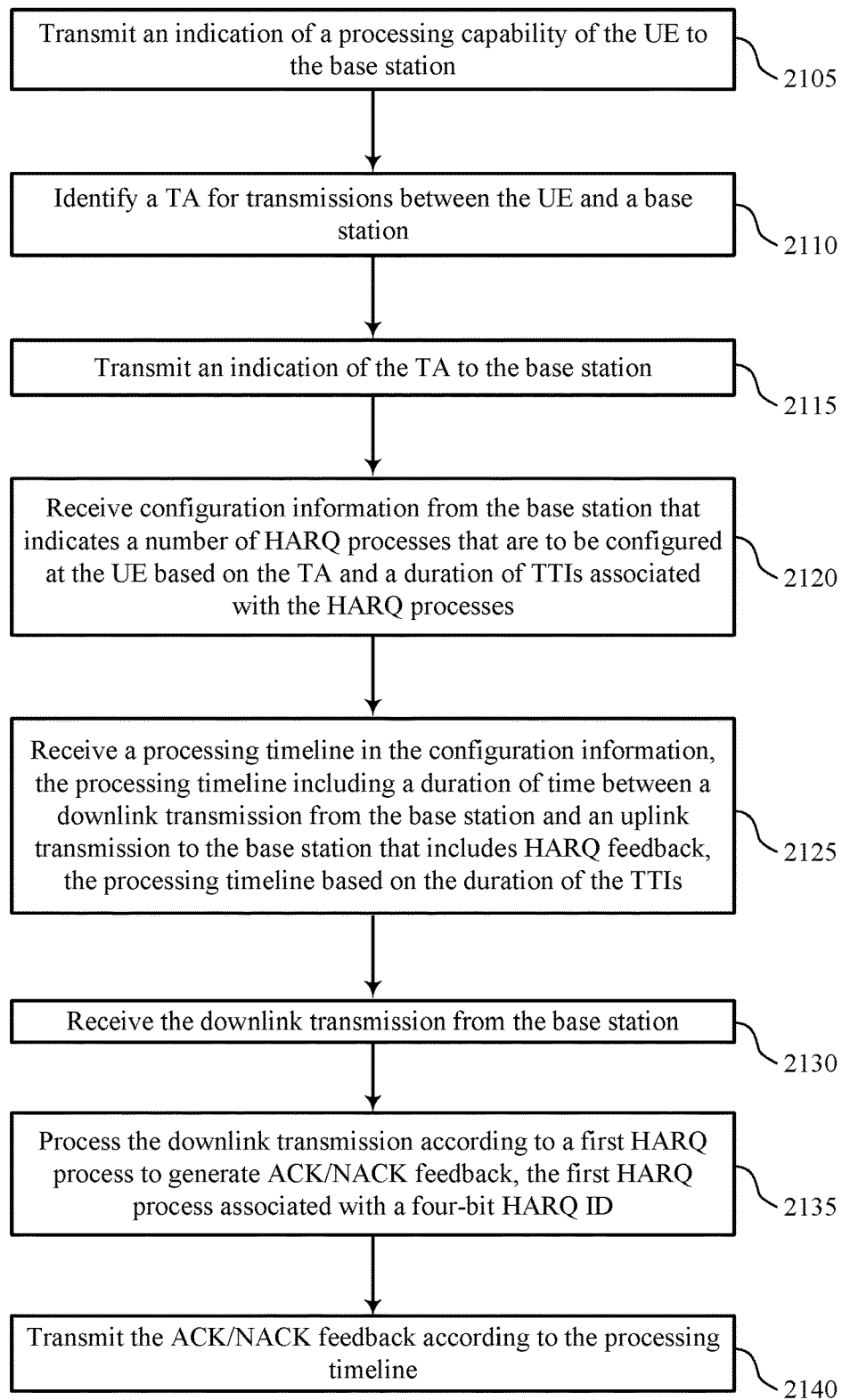

FIG. 21 shows a flowchart illustrating a method 2100 for feedback processing techniques in wireless transmissions in accordance with aspects of the present disclosure. The operations of method 2100 may be implemented by a UE 115 or its components as described herein. For example, the operations of method 2100 may be performed by a UE HARQ manager as described with reference to FIGS. 11 through 14. In some examples, a UE 115 may execute a set of codes to control the functional elements of the device to perform the functions described below. Additionally or alternatively, the UE 115 may perform aspects of the functions described below using special-purpose hardware.

At block 2105 the UE 115 may transmit an indication of a processing capability of the UE to the base station, where the number of HARQ processes may be based at least in part on the processing capability of the UE. The operations of block 2105 may be performed according to the methods described herein. In certain examples, aspects of the operations of block 2105 may be performed by a processing capability component as described with reference to FIGS. 11 through 14.

At block 2110 the UE 115 may identify a TA for transmissions between the UE and a base station. The operations of block 2110 may be performed according to the methods described herein. In certain examples, aspects of the operations of block 2110 may be performed by a TA manager as described with reference to FIGS. 11 through 14.

At block 2115 the UE 115 may transmit an indication of the TA to the base station. The operations of block 2115 may be performed according to the methods described herein. In certain examples, aspects of the operations of block 2115 may be performed by a TA manager as described with reference to FIGS. 11 through 14.

At block 2120 the UE 115 may receive configuration information from the base station that indicates a number of HARQ processes that are to be configured at the UE based at least in part on the TA and a duration of TTIs associated with the HARQ processes. The operations of block 2120 may be performed according to the methods described herein. In certain examples, aspects of the operations of block 2120 may be performed by a configuration manager as described with reference to FIGS. 11 through 14.

At block 2125 the UE 115 may receive a processing timeline in the configuration information, the processing timeline comprising a duration of time between a downlink transmission from the base station and an uplink transmission to the base station that includes HARQ feedback, the processing timeline based at least in part on the duration of the TTIs. The operations of block 2125 may be performed according to the methods described herein. In certain examples, aspects of the operations of block 2125 may be performed by a processing timeline component as described with reference to FIGS. 11 through 14.

At block 2130 the UE 115 may receive the downlink transmission from the base station. The operations of block 2130 may be performed according to the methods described herein. In certain examples, aspects of the operations of block 2130 may be performed by a receiver as described with reference to FIGS. 11 through 14.

At block 2135 the UE 115 may process the downlink transmission according to a first HARQ process to generate ACK/NACK feedback, the first HARQ process associated with a four-bit HARQ ID. The operations of block 2135 may be performed according to the methods described herein. In certain examples, aspects of the operations of block 2135 may be performed by a decoding component as described with reference to FIGS. 11 through 14.

At block 2140 the UE 115 may transmit the ACK/NACK feedback according to the processing timeline. The operations of block 2140 may be performed according to the methods described herein. In certain examples, aspects of the operations of block 2140 may be performed by a ACK/NACK component as described with reference to FIGS. 11 through 14.

Figure 22:
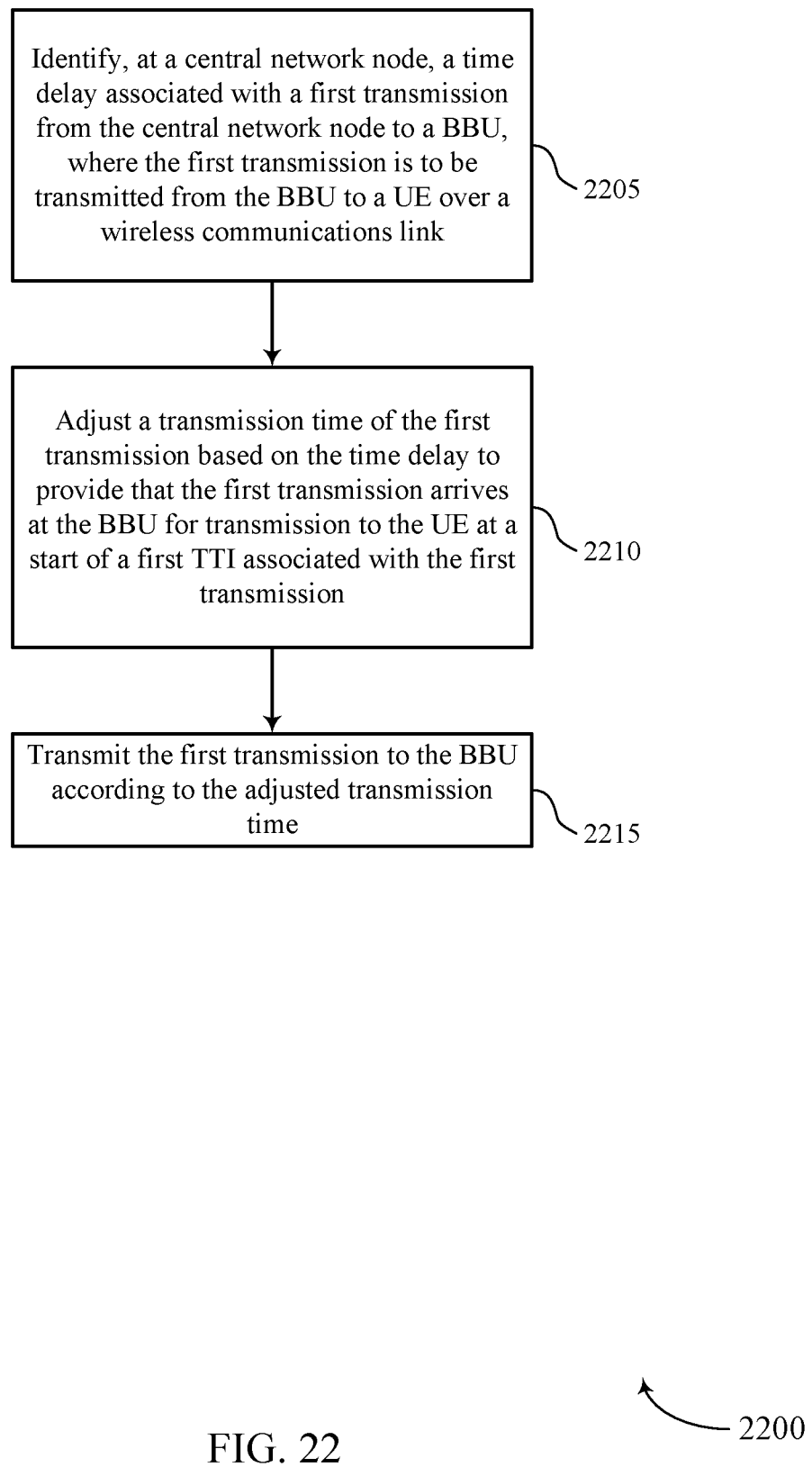

FIG. 22 shows a flowchart illustrating a method 2200 for feedback processing techniques in wireless transmissions in accordance with aspects of the present disclosure. The operations of method 2200 may be implemented by a network entity 140 or its components as described herein. For example, the operations of method 2200 may be performed by a network entity HARQ manager of a RRU as described with reference to FIGS. 15 through 18. In some examples, a RRU, also referred to as a network entity 140, may execute a set of codes to control the functional elements of the device to perform the functions described below. Additionally or alternatively, the network entity 140 may perform aspects of the functions described below using special-purpose hardware.

At block 2205 the network entity 140 may identify, at a central network node, a time delay associated with a first transmission from the central network node to a BBU, wherein the first transmission is to be transmitted from the BBU to a UE over a wireless communications link. The operations of block 2205 may be performed according to the methods described herein. In certain examples, aspects of the operations of block 2205 may be performed by a network time delay component as described with reference to FIGS. 15 through 18.

At block 2210 the network entity 140 may adjust a transmission time of the first transmission based at least in part on the time delay to provide that the first transmission arrives at the BBU for transmission to the UE at a start of a first TTI associated with the first transmission. The operations of block 2210 may be performed according to the methods described herein. In certain examples, aspects of the operations of block 2210 may be performed by a transmission time adjustment component as described with reference to FIGS. 15 through 18.

At block 2215 the network entity 140 may transmit the first transmission to the BBU according to the adjusted transmission time. The operations of block 2215 may be performed according to the methods described herein. In certain examples, aspects of the operations of block 2215 may be performed by a transmission manager as described with reference to FIGS. 15 through 18.

Figure 23:
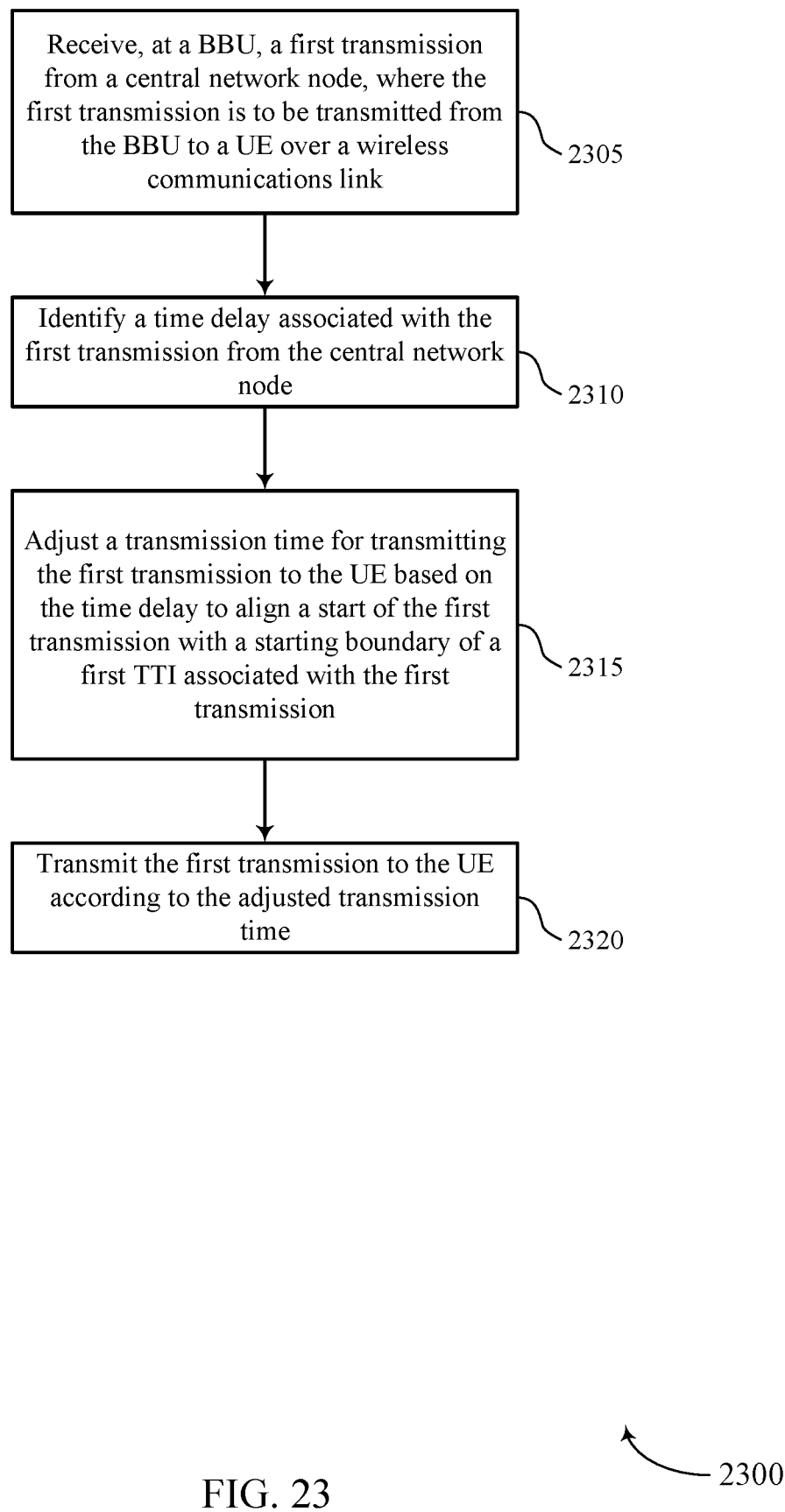

FIG. 23 shows a flowchart illustrating a method 2300 for feedback processing techniques in wireless transmissions in accordance with aspects of the present disclosure. The operations of method 2300 may be implemented by a BBU or its components as described herein. For example, the operations of method 2300 may be performed by a network entity HARQ manager as described with reference to FIGS. 15 through 18. In some examples, a network entity BBU may execute a set of codes to control the functional elements of the device to perform the functions described below. Additionally or alternatively, the network entity BBU may perform aspects of the functions described below using special-purpose hardware.

At block 2305 the network entity BBU may receive a first transmission from a central network node, where the first transmission is to be transmitted from the BBU to a UE over a wireless communications link. The operations of block 2305 may be performed according to the methods described herein. In certain examples, aspects of the operations of block 2305 may be performed by a transmission manager as described with reference to FIGS. 15 through 18.

At block 2310 the network entity BBU may identify a time delay associated with the first transmission from the central network node. The operations of block 2310 may be performed according to the methods described herein. In certain examples, aspects of the operations of block 2310 may be performed by a network time delay component as described with reference to FIGS. 15 through 18.

At block 2315 the network entity BBU may adjust a transmission time for transmitting the first transmission to the UE based at least in part on the time delay to align a start of the first transmission with a starting boundary of a first TTI associated with the first transmission. The operations of block 2315 may be performed according to the methods described herein. In certain examples, aspects of the operations of block 2315 may be performed by a transmission time adjustment component as described with reference to FIGS. 15 through 18.

At block 2320 the network entity BBU may transmit the first transmission to the UE according to the adjusted transmission time. The operations of block 2320 may be performed according to the methods described herein. In certain examples, aspects of the operations of block 2320 may be performed by a transmission manager as described with reference to FIGS. 15 through 18.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:
1. A method for wireless communication, comprising:
   identifying a processing timeline for a user equipment (UE) to transmit a hybrid acknowledgment repeat request (HARQ) feedback transmission in response to a downlink transmission, the processing timeline comprising a number of transmission time intervals (TTIs) between the downlink transmission and an uplink transmission that includes the HARQ feedback;

determining a configuration establishing a number of HARQ processes for use by the UE, the number of HARQ processes based at least in part on the processing timeline, a timing advance (TA) of the UE, and a duration of the TTIs associated with the HARQ feedback transmission, and wherein the number of HARQ processes is set to be greater than or equal to twice the number of TTIs; and transmitting the configuration to the UE.

2. The method of claim 1, wherein the determining the configuration further comprises:

identifying a processing capability of the UE, and determining the number of HARQ processes based at least in part on the processing capability of the UE and the TA of the UE.

3. The method of claim 1, wherein the determining the configuration further comprises:

identifying a threshold TA value for setting the number of HARQ processes at the UE;

comparing the TA of the UE to the threshold TA value; and setting a first number of HARQ processes or a second number of HARQ processes for use by the UE based at least in part on whether the TA of the UE is less than or greater than the threshold TA value, wherein the first number of HARQ processes is less than the second number of HARQ processes.

4. The method of claim 1, wherein the determining the configuration further comprises:

identifying the TA of the UE based on a first TA value for transmissions between the UE and a baseband unit and a second TA value for transmissions between the baseband unit and a central network node, and wherein the number of HARQ processes is based at least in part on the second TA value, the first TA value, or any combination thereof.

5. The method of claim 4, wherein the determining the configuration further comprises:

comparing the second TA value to a threshold TA value, and wherein the number of HARQ processes is further determined based at least in part on the comparing.

6. The method of claim 1, wherein the identifying the processing timeline further comprises:

determining a maximum TA value for the UE; and determining the processing timeline based at least in part on the maximum TA value.

7. The method of claim 6, wherein the processing timeline is further based at least in part on a processing capability of the UE.

8. The method of claim 1, wherein the HARQ feedback transmission is associated with a four-bit HARQ ID.

9. The method of claim 1, further comprising:

configuring a round trip time (RTT) for the HARQ feedback transmission and an associated retransmission of the downlink transmission, the RTT based on the processing timeline irrespective of the number of HARQ processes.

10. The method of claim 1, wherein the transmitting the configuration to the UE comprises transmitting radio resource control (RRC) signaling to the UE or downlink control information (DCI) to the UE that includes configuration information.

11. A method for wireless communication, comprising:

identifying, at a UE, a timing advance (TA) for transmissions between the UE and a base station;

transmitting an indication of the TA to the base station; and receiving configuration information from the base station that indicates a number of hybrid acknowledgment repeat request (HARQ) processes that are to be configured at the UE based at least in part on the TA and a duration of transmission time intervals (TTIs) associated with the HARQ processes, wherein a processing timeline between a downlink transmission from the base station and an uplink transmission to the base station that includes HARQ feedback for the downlink transmission corresponds to a number of TTIs, and the number of HARQ processes is set to be greater than or equal to twice the number of TTIs.

12. The method of claim 11, further comprising:

receiving the processing timeline in the configuration information, and wherein the processing timeline is based at least in part on the duration of the TTIs.

13. The method of claim 12, wherein the processing timeline is further based at least in part on a processing capability of the UE.

14. The method of claim 12, further comprising:

receiving the downlink transmission from the base station;

processing the downlink transmission according to a first HARQ process to generate acknowledgment/negative-acknowledgment (ACK/NACK) feedback, the first HARQ process associated with a four-bit HARQ ID; and transmitting the ACK/NACK feedback according to the processing timeline.

15. The method of claim 11, further comprising:

transmitting an indication of a processing capability of the UE to the base station, and wherein the number of HARQ processes is further based at least in part on the processing capability.

16. The method of claim 11, wherein the configuration information comprises a threshold TA value for setting the number of HARQ processes at the UE, and wherein the method further comprises:

comparing the TA to the threshold TA value; and setting a first number of HARQ processes or a second number of HARQ processes based at least in part on whether the TA is less than or greater than the threshold TA value, wherein the first number of HARQ processes is less than the second number of HARQ processes.

17. The method of claim 11, further comprising:

configuring a plurality of soft buffers for buffering received transmissions associated with one or more of the HARQ processes, a number of the soft buffers based at least in part on the number of TTIs in the processing timeline or the number of HARQ processes.

18. The method of claim 11, wherein the configuration information further comprises an indication of a round trip time (RTT) for HARQ feedback transmissions and associated retransmissions, the RTT based on a processing timeline for HARQ feedback and irrespective of the number of HARQ processes.

19. An apparatus for wireless communication, comprising:

a processor;

memory in electronic communication with the processor; and instructions stored in the memory and operable, when executed by the processor, to cause the apparatus to:

identify a processing timeline for a UE to transmit a HARQ feedback transmission in response to a downlink transmission, the processing timeline comprising a number of transmission time intervals (TTIs) between the downlink transmission and an uplink transmission that includes the HARQ feedback;

determine a configuration establishing a number of HARQ processes for use by the UE, the number of HARQ processes based at least in part on the processing timeline, a TA of the UE, and a duration of TTIs associated with the HARQ feedback transmission, and wherein the number of HARQ processes is set to be greater than or equal to twice the number of TTIs; and transmit the configuration to the UE.

20. The apparatus of claim 19, wherein the instructions are further executable by the processor to cause the apparatus to:

identify a processing capability of the UE, and determine the number of HARQ processes based at least in part on the processing capability of the UE and the TA of the UE.

21. The apparatus of claim 19, wherein the instructions are further executable by the processor to cause the apparatus to:

identify a threshold TA value for setting the number of HARQ processes at the UE;

compare the TA of the UE to the threshold TA value; and set a first number of HARQ processes or a second number of HARQ processes for use by the UE based at least in part on whether the TA of the UE is less than or greater than the threshold TA value, wherein the first number of HARQ processes is less than the second number of HARQ processes.

22. The apparatus of claim 19, wherein the instructions are further executable by the processor to cause the apparatus to:

identify the TA of the UE based on a first TA value for transmissions between the UE and a baseband unit and a second TA value for transmissions between the baseband unit and a central network node, and wherein the number of HARQ processes is based at least in part on the second TA value, the first TA value, or any combination thereof.

23. The apparatus of claim 19, wherein the instructions are further executable by the processor to cause the apparatus to:

determine a maximum TA value for the UE; and determine the processing timeline based at least in part on the maximum TA value.

24. An apparatus for wireless communication, comprising:

a processor;

memory in electronic communication with the processor; and instructions stored in the memory and operable, when executed by the processor, to cause the apparatus to:

identify, at a UE, a TA for transmissions between the UE and a base station;

transmit an indication of the TA to the base station; and receive configuration information from the base station that indicates a number of HARQ processes that are to be configured at the UE based at least in part on the TA and a duration of transmission time intervals (TTIs) associated with the HARQ processes, wherein a processing timeline between a downlink transmission from the base station and an uplink transmission to the base station that includes HARQ feedback for the downlink transmission corresponds to a number of TTIs, and the number of HARQ processes is set to be greater than or equal to twice the number of TTIs.

25. The apparatus of claim 24, wherein the instructions are further executable by the processor to cause the apparatus to:

receive the processing timeline in the configuration information, and wherein the processing timeline is based at least in part on the duration of the TTIs.

26. The apparatus of claim 25, wherein the instructions are further executable by the processor to cause the apparatus to:

receive the downlink transmission from the base station;

process the downlink transmission according to a first HARQ process to generate acknowledgment/negative-acknowledgment (ACK/NACK) feedback, the first HARQ process associated with a four-bit HARQ ID; and transmit the ACK/NACK feedback according to the processing timeline.

27. The apparatus of claim 24, wherein the instructions are further executable by the processor to cause the apparatus to:

transmit an indication of a processing capability of the UE to the base station, and wherein the number of HARQ processes is further based at least in part on the processing capability.

28. The apparatus of claim 24, wherein the instructions are further executable by the processor to cause the apparatus to:

configure a plurality of soft buffers for buffering received transmissions associated with one or more of the HARQ processes, a number of the soft buffers based at least in part on the number of TTIs in the processing timeline or the number of HARQ processes.

* * * * *